(12) United States Patent
Park et al.

(10) Patent No.: US 10,667,302 B2
(45) Date of Patent: *May 26, 2020

(54) METHOD FOR TRANSMITTING UPLINK FRAME IN WIRELESS LAN SYSTEM, AND WIRELESS TERMINAL USING SAME

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/087,566

(22) PCT Filed: Mar. 22, 2017

(86) PCT No.: PCT/KR2017/003054
§ 371 (c)(1),
(2) Date: Sep. 21, 2018

(87) PCT Pub. No.: WO2017/164638
PCT Pub. Date: Sep. 28, 2017

(65) Prior Publication Data
US 2019/0110315 A1 Apr. 11, 2019

Related U.S. Application Data

(60) Provisional application No. 62/311,422, filed on Mar. 22, 2016, provisional application No. 62/315,684, filed on Mar. 31, 2016.

(51) Int. Cl.
*H04W 74/08* (2009.01)
*H04W 84/12* (2009.01)
(Continued)

(52) U.S. Cl.
CPC ......... *H04W 74/085* (2013.01); *H04L 1/1803* (2013.01); *H04L 5/0055* (2013.01);
(Continued)

(58) Field of Classification Search
None
See application file for complete search history.

(56) References Cited

U.S. PATENT DOCUMENTS 8,050,249 B1 * 11/2011 Salhotra ................ H04L 1/1887
370/349

FOREIGN PATENT DOCUMENTS

KR 1020090051071 5/2009
KR 1020100093903 8/2010
(Continued)

OTHER PUBLICATIONS

PCT International Application No. PCT/KR2017/003054, International Search Report dated May 24, 2017, 4 pages.
(Continued)

*Primary Examiner* — Christine T Duong
(74) *Attorney, Agent, or Firm* — Lee, Hong, Degerman, Kang & Waimey

(57) ABSTRACT

A method for transmitting an uplink frame in a wireless LAN system according to an embodiment of the present specification comprises the steps in which: a user STA configures a backoff counter for contention-based channel access according to first parameter information for multiple users when a first trigger frame for uplink transmission of the multiple users is received from an AP; the user STA performs a countdown operation on the basis of the backoff counter configured according to the first parameter information; the user STA interrupts the countdown operation in order to transmit a trigger-based uplink frame in response to a second trigger frame when the second trigger frame is received; and the user STA resumes the countdown operation, which has been interrupted, when an ACK frame corresponding to the trigger-based uplink frame is not received.

9 Claims, 19 Drawing Sheets

(51) Int. Cl.
*H04L 1/18* (2006.01)
*H04L 5/00* (2006.01)
*H04W 28/06* (2009.01)
*H04W 72/12* (2009.01)
*H04L 1/16* (2006.01)

(52) U.S. Cl.
CPC ....... *H04W 28/06* (2013.01); *H04W 72/1242* (2013.01); *H04W 84/12* (2013.01); *H04L 1/1614* (2013.01)

(56) References Cited

FOREIGN PATENT DOCUMENTS

| KR | 1020120062835 | 6/2012 |
|---|---|---|
| WO | 2016028117 | 2/2016 |

OTHER PUBLICATIONS

Ekici, "Improvements and Performance Analysis of IEEE 80211 Medium Access Protocols", Ottawa-Carleton Institute for Electrical and Computer Engineering School of Information Technology and Engineering Faculty of Engineering University of Ottawa, 2009, 142 pages.

\* cited by examiner (A)

(B)

METHOD FOR TRANSMITTING UPLINK FRAME IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2017/003054, filed on Mar. 22, 2017, which claims the benefit of U.S. Provisional Application Nos. 62/311,422, filed on Mar. 22, 2016 and 62/315,684, filed on Mar. 31, 2016, the contents of which are all hereby incorporated by reference herein in their entirety.

BACKGROUND OF THE INVENTION

Field of the Invention

This specification related to wireless communication and, most particularly, to a method for transmitting an uplink frame in a wireless LAN system, and a wireless terminal using the same.

Related Art

With the recent evolution in the information communication technology, diverse types of wireless communication technology are being developed. Most particularly, the wireless local area network (hereinafter referred to as 'WLAN') corresponds to a technology that allows wireless access to the Internet from general households, companies, or specific service providing areas by using a portable device based on a radio frequency technology.

For example, the portable device may correspond to a personal digital assistant (PDA), a laptop computer, a portable multimedia player (PMP), and so on. Generally, a device-to-device communication of a WLAN system is carried out by passing through a management entity, such as a base station or an access point (AP). The management entity performs scheduling for data communication. In order to ensure flexibility in the device-to-device communication of the WLAN system, diverse protocols for performing device-to-device communication without passing through the management entity are being proposed.

SUMMARY OF THE INVENTION

Technical Objects

An object of this specification is to provide a method for transmitting an uplink frame in a wireless LAN system, and a wireless terminal using the same.

Technical Solutions

This specification relates to a method for transmitting an uplink frame in a wireless LAN system. The method for transmitting an uplink frame in a wireless LAN system according to an exemplary embodiment of this specification may include the steps of, if a first trigger frame for uplink transmission of multi-users is received from an access point (AP), configuring, by a user station (STA), a backoff counter for a contention-based channel access according to first parameter information for the multi-users, performing, by the user STA, countdown operations based on a backoff counter configured according to the first parameter information, if a second trigger frame is received, suspending, by the user STA, the countdown operation for a transmission of a trigger-based uplink frame as a response to the second trigger frame, and if an acknowledgement (ACK) frame corresponding to the trigger-based uplink frame fails to be received, resuming, by the user STA, the suspended countdown operation.

Effects of the Invention

According to an exemplary embodiment of this specification, provided herein is a method for transmitting an uplink frame in a wireless LAN system having an enhanced performance (or capability), and a wireless terminal using the same.

DESCRIPTION OF EXEMPLARY EMBODIMENTS

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

The terms used in the present specification have the meaning as commonly understood by those ordinarily skilled in the art to which the present specification pertains. Commonly used terms should be interpreted as having a meaning that is consistent with their meaning in the context of the present specification. Further, the terms used in the present specification should not be interpreted in an excessively idealized or formal sense unless otherwise defined. Hereinafter, an embodiment of the present specification is described with reference to the accompanying drawings.

Figure 1:
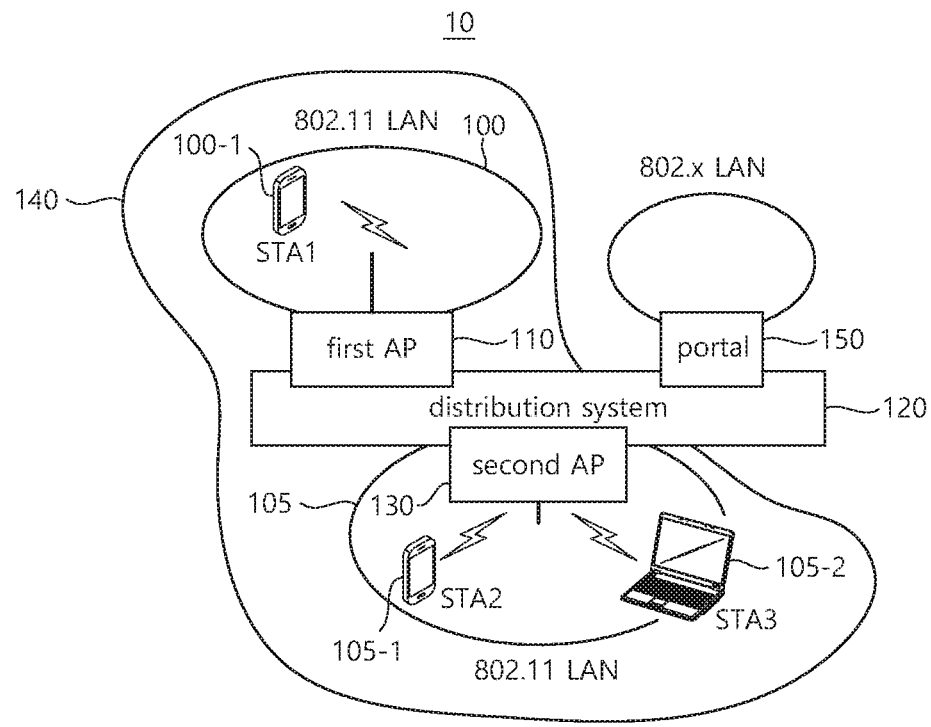
FIG. 1 is a conceptual view illustrating the structure of a wireless local area network.
Figure 1:
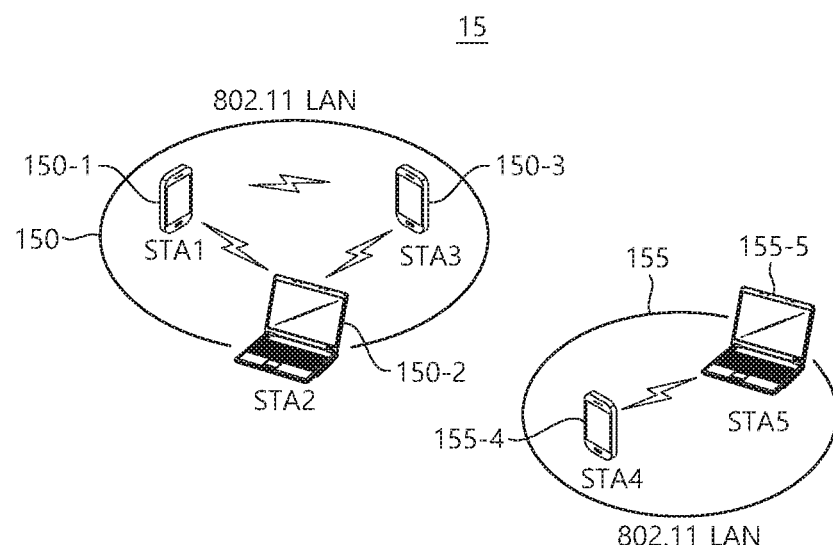

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the wireless LAN system 10 of the FIG. 1(A) may include one or more infrastructure BSSs 100 and 105 (hereinafter, referred to as BSS). The BSSs 100 and 105 as a set of an AP and an STA such as an access point (AP) 125 and a station (STA1) (100-1) which are successfully synchronized to communicate with each other are not concepts indicating a specific region.

For example, the BSS (100) may include one AP (110) and one or more STAs (100-1) which may be associated with one AP (110). The BSS (105) may include one or more STAs (105-1 and 105-2) which may be associated with one AP (130).

The infrastructure BSS (100, 105) may include at least one STA, APs (125, 130) providing a distribution service, and a distribution system (DS) (120) connecting multiple APs.

The distribution system (120) may implement an extended service set (ESS) (140) extended by connecting the multiple BSSs (100 and 105). The ESS (140) may be used as a term indicating one network configured by connecting one or more APs (110 or 130) through the distribution system (120). The AP included in one ESS (140) may have the same service set identification (SSID).

A portal (150) may serve as a bridge which connects the wireless LAN network (IEEE 802.11) and another network (e.g., 802.X).

In the BSS illustrated in the FIG. 1(A), a network between the APs (110 and 130) and a network between the APs (110 and 130) and the STAs (100-1, 105-1, and 105-2) may be implemented.

FIG. 1(B) illustrates a conceptual view illustrating the IBSS. Referring to FIG. 1(B), a WLAN system (15) of FIG. 1(B) may be capable of performing communication by configuring a network between STAs in the absence of the APs (110 and 130) unlike in FIG. 1(A). When communication is performed by configuring the network also between the STAs in the absence of the AP (110 and 130), the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS (15), STAs (150-1, 150-2, 150-3, 155-4, and 155-5) are managed by a distributed manner.

In the IBSS, all STAs (150-1, 150-2, 150-3, 155-4, and 155-5) may be constituted as movable STAs and are not permitted to access the DS to constitute a self-contained network.

The STA, which is mentioned in this specification, as a predetermined functional medium that includes a medium access control (MAC) that follows a regulation of an Institute of Electrical and Electronics Engineers (IEEE) 802.11 standard and a physical layer interface for a radio medium, may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
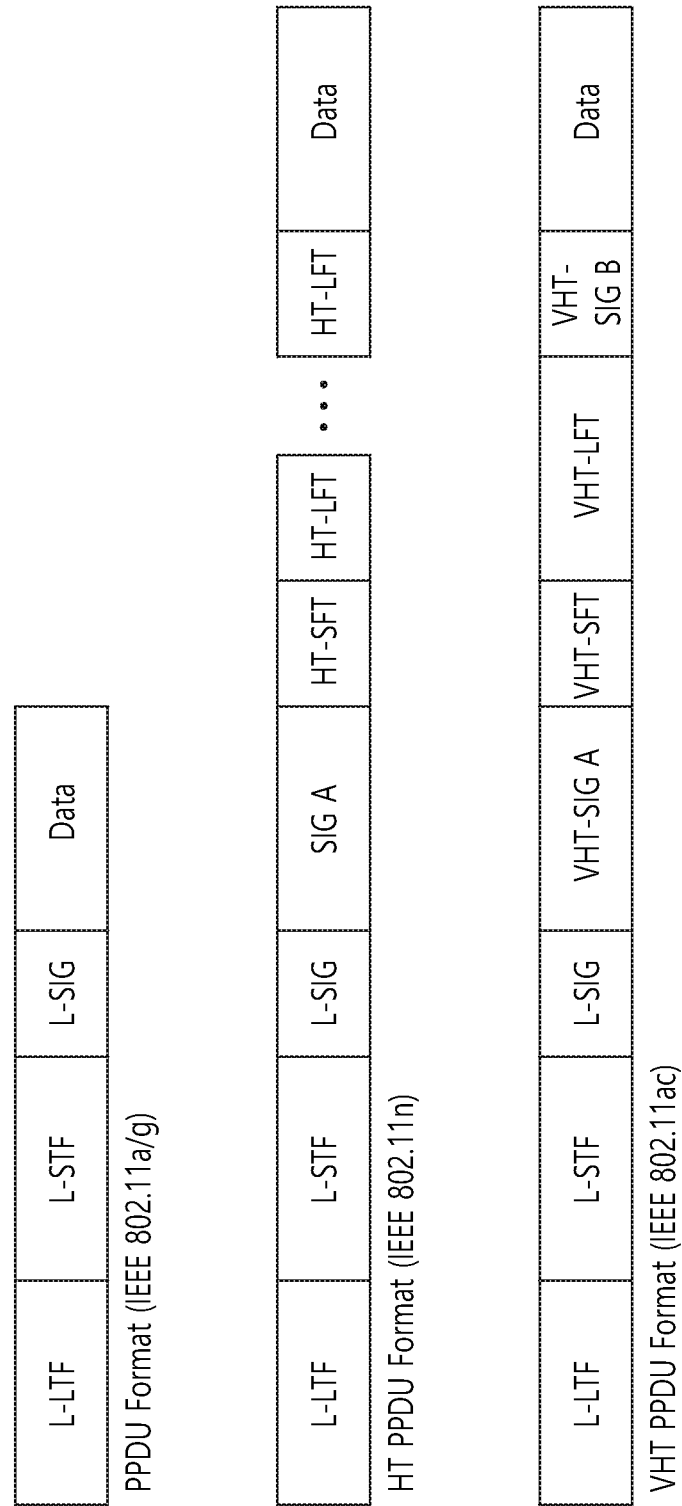
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
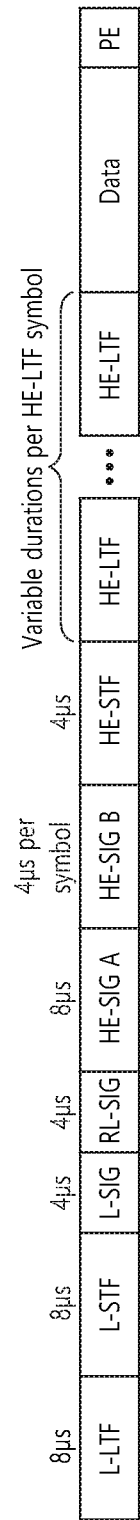
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted during an illustrated time period (that is, 4 or 8 μs). More detailed description of the respective fields of FIG. 3 will be provided below.

Figure 4:
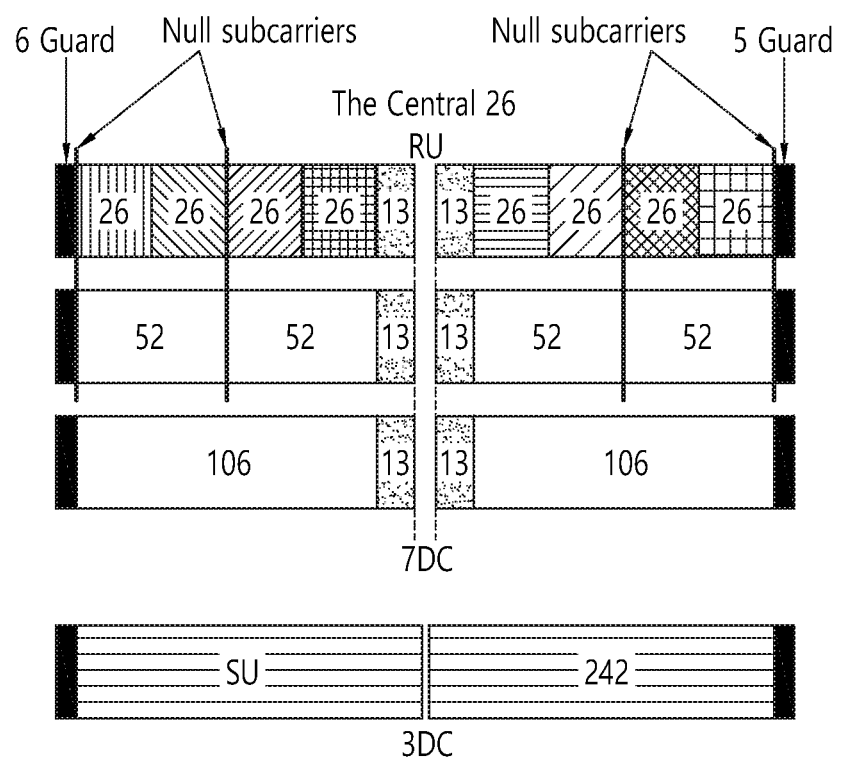
FIG. 4 is a diagram illustrating a layout of resource units used in a band of 20 MHz.

FIG. 4 is a diagram illustrating a layout of resource units (RUs) used in a band of 20 MHz. As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used, and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
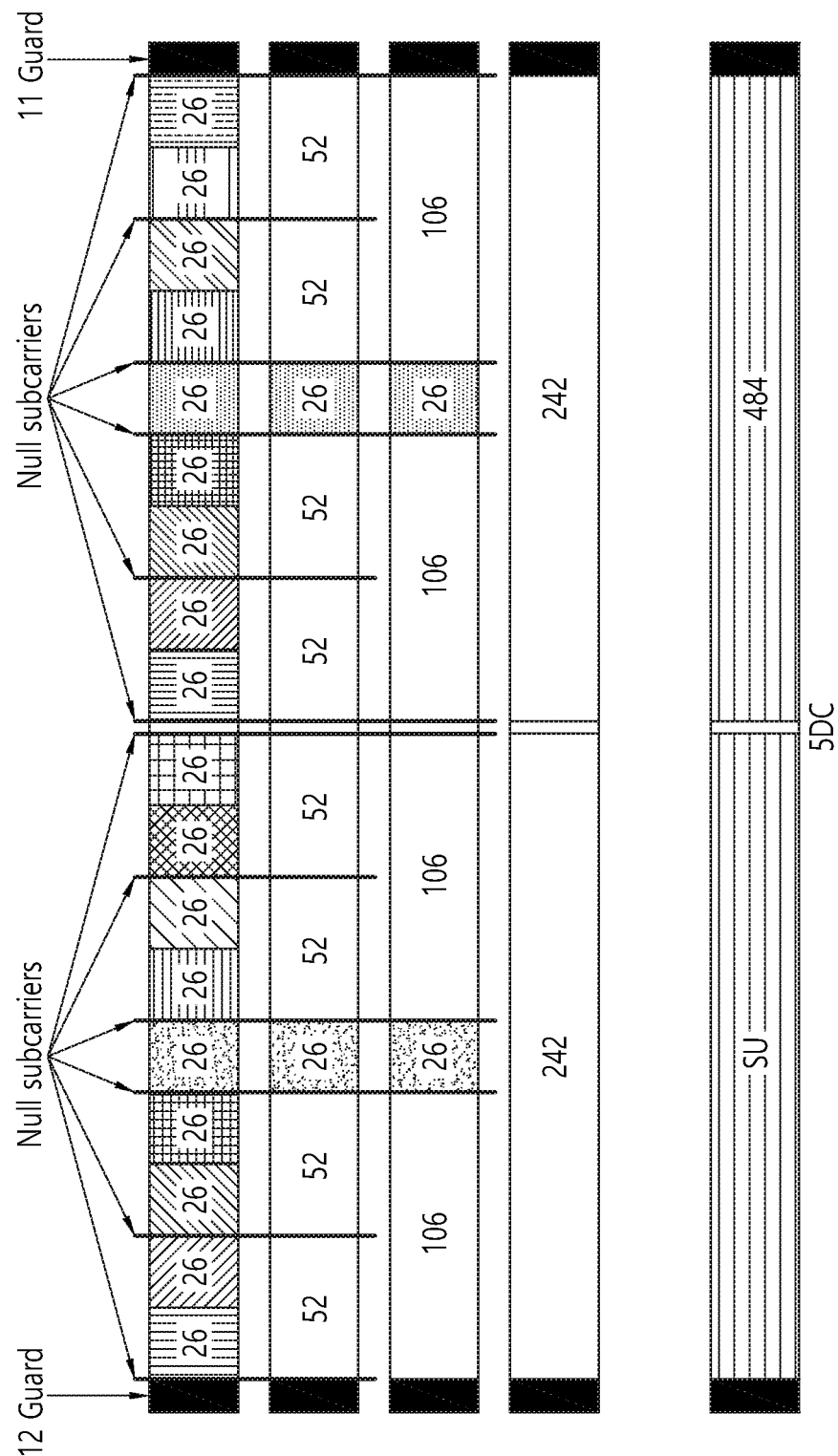
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
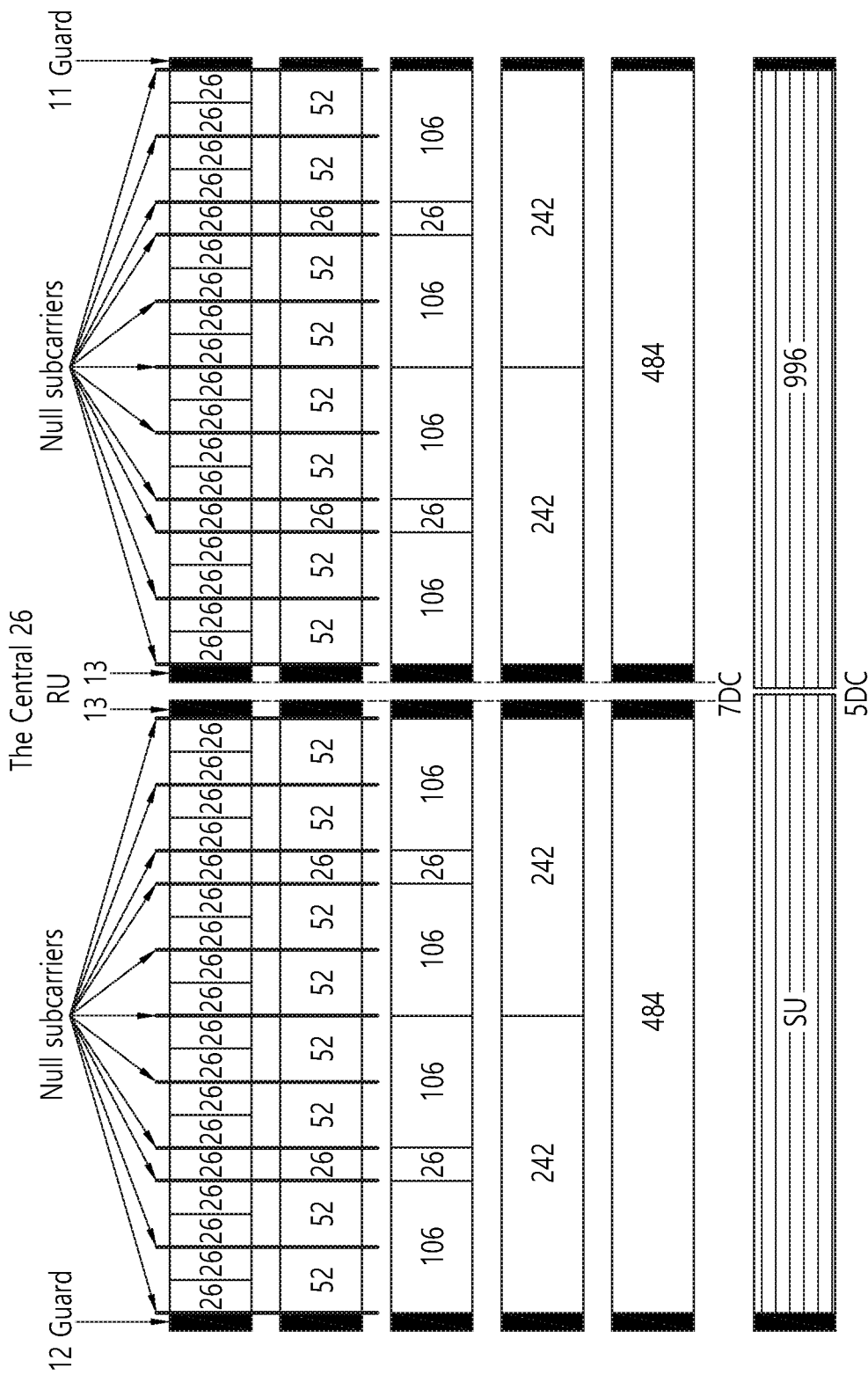
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted. Meanwhile, the detailed number of RUs may be modified similarly to one example of each of FIG. 4 or 5.

Figure 7:
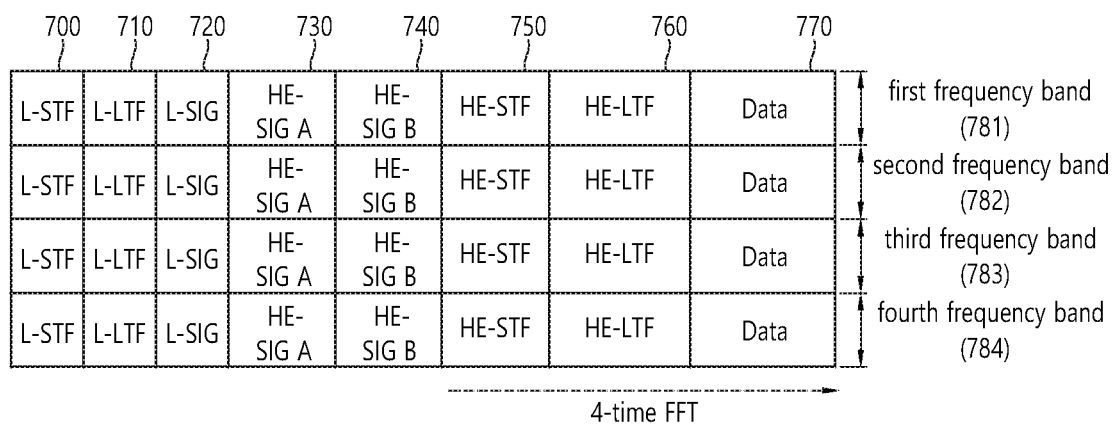
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA. The HE-SIG-B (740) will be described below in a greater detail with reference to FIG. 8.

A previous field of the HE-SIG-B (740) may be transmitted in a duplicated form on an MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous (or non-continuous) 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user, i.e., a receiving station, may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of this specification, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
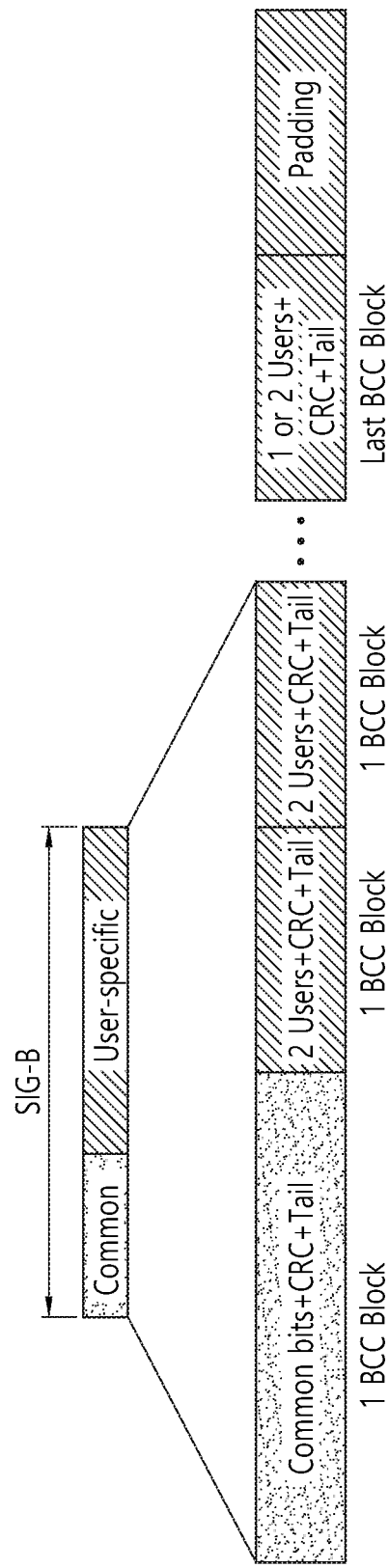
FIG. 8 is a block diagram illustrating one example of HE-SIG-B.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
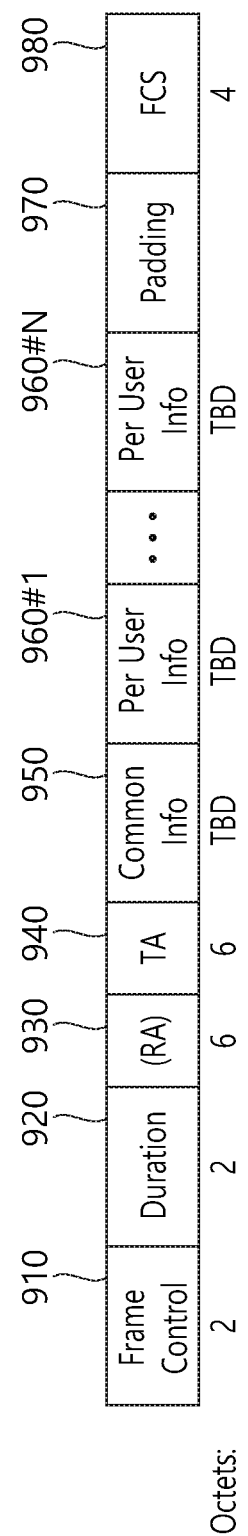
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

In addition, the RA field (930) may include address information of the receiving STA of a corresponding trigger frame and may be optionally omitted. The TA field (940) includes address information of an STA (e.g., AP) for transmitting the trigger frame, and the common information field (950) includes common control information applied to the receiving STA for receiving the trigger frame.

It is preferable that the trigger frame of FIG. 9 includes per user information fields (960#1 to 960#N) corresponding to the number of receiving STAs receiving the trigger frame of FIG. 9. The per user information field may also be referred to as a "RU Allocation field".

Additionally, the trigger frame of FIG. 9 may include a Padding field (970) and a Sequence field (980).

It is preferable that each of the per user information fields (960#1 to 960#N) shown in FIG. 9 further includes multiple sub-fields.

Figure 10:
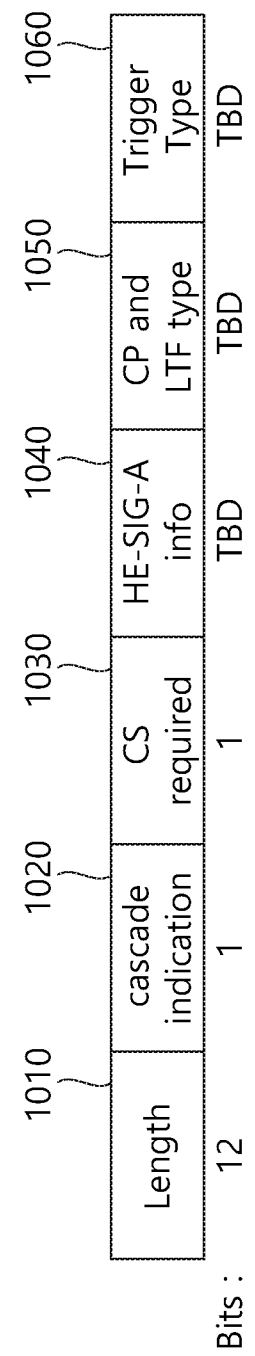
FIG. 10 illustrates an example of a common information field.

FIG. 10 illustrates an example of a common information field. Some parts of the sub-field of FIG. 10 may be omitted, and extra sub-fields may be added. Further, a length of each of the sub-fields shown herein may change.

As shown in the drawing, the Length field (1010) may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field (1010) of the trigger frame may be used for indicating the length of its respective uplink PPDU.

Additionally, a Cascade Indicator field (1020) indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field (1030) indicates whether or not the status or NAV of a wireless medium is required to be considered in a situation where a receiving device that has received the corresponding trigger frame transmits the respective uplink PPDU.

A HE-SIG-A information field (1040) may include information controlling the content of a SIG-A field (i.e., HE-SIG-A field) of an uplink PPDU, which is being transmitted in response to the corresponding trigger frame.

A CP and LTF type field (1050) may include information on an LTF length and a CP length of the uplink PPDU being transmitted in response to the corresponding trigger frame. A trigger type field (1060) may indicate a purpose for which the corresponding trigger frame is being used, e.g., general triggering, triggering for beamforming, and so on, a request for a Block ACK/NACK, and so on.

Figure 11:
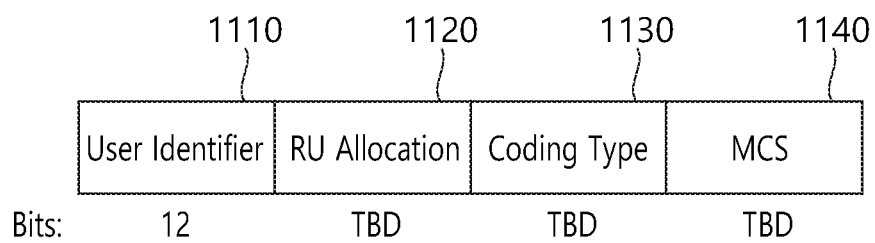
FIG. 11 illustrates an example of a sub-field being included in a per user information field.

FIG. 11 illustrates an example of a sub-field being included in a per user information field. Among the sub-fields of FIG. 11, some (or part) of the sub-fields may be omitted, and other additional sub-fields may also be added. Additionally, the length of each of the sub-fields shown in the drawing may be varied.

A User Identifier field (1110) of FIG. 11 indicates an identifier of an STA (i.e., receiving STA) to which the per user information corresponds, and an example of the identifier may correspond to all or part of the AID.

Additionally, a RU Allocation field (1120) may be included in the sub-field of the per user information field. More specifically, in case a receiving STA, which is identified by the User Identifier field (1110), transmits an uplink PPDU in response to the trigger frame of FIG. 9, the corresponding uplink PPDU is transmitted through the RU, which is indicated by the RU Allocation field (1120). In this case, it is preferable that the RU that is being indicated by the RU Allocation field (1120) corresponds to the RU shown in FIG. 4, FIG. 5, and FIG. 6.

The sub-field of FIG. 11 may include a Coding Type field (1130). The Coding Type field (1130) may indicate a coding type of the uplink PPDU being transmitted in response to the trigger frame of FIG. 9. For example, in case BBC coding is applied to the uplink PPDU, the Coding Type field (1130) may be set to '1', and, in case LDPC coding is applied to the uplink PPDU, the Coding Type field (1130) may be set to '0'.

Additionally, the sub-field of FIG. 11 may include an MCS field (1140). The MCS field (1140) may indicate an MCS scheme being applied to the uplink PPDU that is transmitted in response to the trigger frame of FIG. 9.

Figure 12:
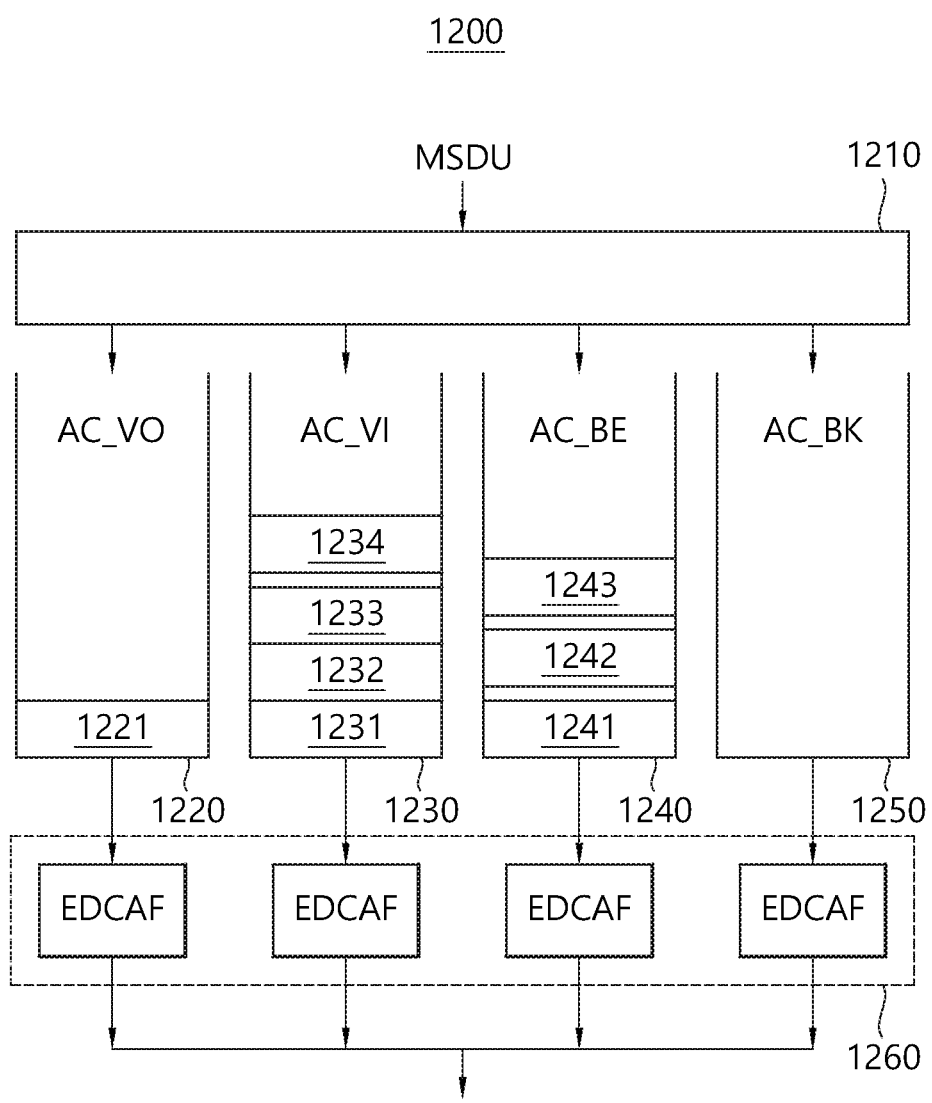
FIG. 12 illustrates an EDCA-based channel access method in a WLAN system according to an exemplary embodiment of this specification.

FIG. 12 illustrates an EDCA-based channel access method in a WLAN system according to an exemplary embodiment of this specification. In the WLAN system, an STA (or AP) performing enhanced distributed channel access (EDCA) may perform channel access according to a plurality of user priority levels that are defined for the traffic data.

The EDCA for the transmission of a Quality of Service (QoS) data frame based on the plurality of user priority levels may be defined as four access categories (hereinafter referred to as 'AC's) (background (AC_BK), best effort (AC_BE), video (AC_VI), and voice (AC_VO)). As an example of traffic data, e.g., MAC service data unit (MSDU), departing from the traffic data departing from a logical link control (LLC) layer and reaching (or arriving at) a medium access control (MAC) layer may be mapped as shown below in Table 1.

Table 1 indicates an exemplary mapping between user priority levels and ACs.

TABLE 1

| Priority | User priority | Access category (AC) |
| --- | --- | --- |
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and an AC parameter may be defined for each AC. A difference in the plurality of user priority levels among the ACs may be implemented based on AC parameter values, which are differently configured for each AC.

When performing a backoff procedure for transmitting a frame belonging to an AC, the EDCA may use each of an arbitration interframe space (AIFS)[AC], a CWmin[AC], and a CWmax[AC] instead of a DCF interframe space (DIFS), a CWmin, and a CWmax, which correspond to parameters for a backoff procedure that is based on a distributed coordination function (DCF).

For reference, default values of the parameters corresponding to each AC are as shown below in Table 2.

TABLE 2

| AC | Cwmin[AC] | CWmax[AC] | AIFS[AC] | TXOP limit[AC] |
| --- | --- | --- | --- | --- |
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameters being used in the backoff procedure for each AC may be configured to have a default value or may be loaded in a beacon frame so as to be delivered to each STA from the AP. As the values of the AIFS[AC] and the CWmin[AC] become lower (or smaller), since the delay time (or latency time) for the channel access becomes shorter, the corresponding STA may have a higher priority level, and, accordingly, a larger number of bands may be used in the given traffic environment.

The EDCA parameter set element may include information on channel access parameters for each AC (e.g., AIFS [AC], CWmin[AC], CWmax[AC]).

In a case where a collision occurs between the STAs, while the STA is transmitting a frame, the backoff procedure of the EDCA, which generates a new backoff count, is similar to the backoff procedure of the conventional (or legacy) DCF. However, the backoff procedure of the EDCA, which is differentiated for each AC, may be performed based on the EDCA parameters being individually distinguished for each AC. The EDCA parameter may function as an important means that is used for distinguishing (or differentiating) the channel access of traffic corresponding to the diverse user priority levels.

An adequate configuration of EDCA parameter values being defined for each AC may optimize network performance (or capability) and may also increase a transmission effect according to the priority level of the traffic at the same time. Therefore, the AP may be capable of performing a function of overall management and control of EDCA parameters in order to ensure a fair medium access to all STAs participating in the network.

Referring to FIG. 12, one STA (or AP) (1200) may include a virtual mapper (1210), a plurality of transmission queues (1220~1250), and a virtual collision handler (1260).

The virtual mapper (1210) of FIG. 12 may perform a function of mapping an MSDU that is received from a logical link control (LLC) layer to transmission queues corresponding to each AC according to Table 1, which is presented above.

The plurality of transmission queues (1220~1250) of FIG. 12 may perform the functions of individual EDCA contention entities for wireless media access within an STA (or AP).

For example, the transmission queue (1220) of the AC_VO type of FIG. 12 may include one frame (1221) for a second STA (not shown). The transmission queue (1230) of the AC_VI type may include 3 frames (1231~1233) for a first STA (not shown) and one frame (1234) for a third STA according to a transmission order by which the frames are to be transmitted to a physical layer.

The transmission queue (1240) of the AC_BE type of FIG. 12 may include one frame (1241) for a second STA (not shown), and one frame (1242) for a third STA (not shown), and one frame (1243) for a second STA (not shown) according to a transmission order by which the frames are to be transmitted to a physical layer.

As an example, the transmission queue (1250) of the AC_BK type of FIG. 12 may not include a frame that is to be transmitted to a physical layer.

If one or more ACs each having completed the backoff procedure exist in the STA at the same time, collision between the ACs may be adjusted (or controlled) according to an EDCA function (EDCAF), which is included in the virtual collision handler (1260). More specifically, the frame belonging to the AC having the highest priority level may be transmitted beforehand, and other ACs may increase the contention window values and may update the backoff count.

A transmission opportunity (TXOP) may be initiated (or started) when a channel is accessed according to an EDCA rule. When two or more frames are accumulated in one AC, and if an EDCA TXOP is acquired, the AC of an EDCA MAC layer may attempt to perform multiple frame transmissions. If the STA has already transmitted one frame, and if the STA is also capable of transmitting a next frame existing in the same AC within the remaining TXOP time and then capable of receiving its respective ACK, the STA may attempt to perform the transmission of the corresponding next frame after an SIFS time interval.

A TXOP limit value may be configured as a default value in the AP and the STA, or a frame that is related to the TXOP limit value may be transported (or delivered) to the STA from the AP.

If the size of the data frame that is to be transmitted exceeds the TXOP limit value, the AP may perform fragmentation on the corresponding frame into a plurality of smaller frames. Subsequently, the fragmented frames may be transmitted within a range that does not exceed the TXOP limit value.

Figure 13:
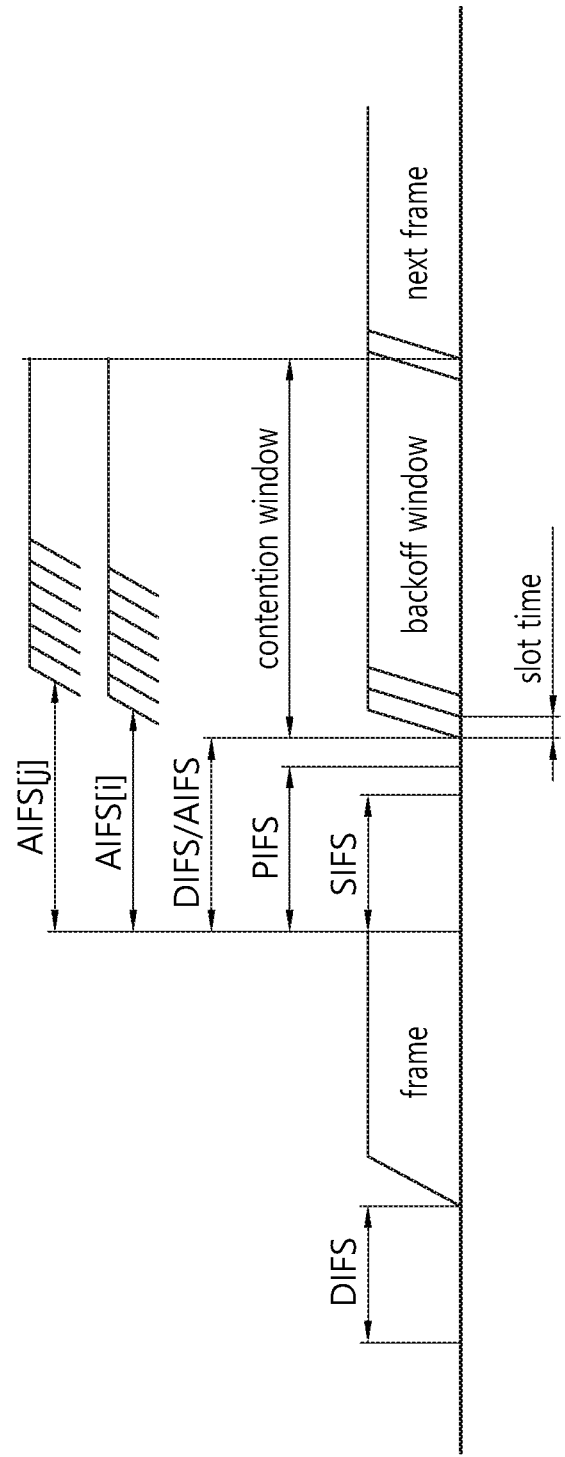
FIG. 13 is a conceptual diagram illustrating a backoff procedure according to EDCA.

FIG. 13 is a conceptual diagram illustrating a backoff procedure according to EDCA.

In an 802.11 MAC layer, a plurality of STAs may share a wireless medium based on a distributed coordination function (hereinafter referred to as 'DCF'). In order to control the collision between STAs, the DCF may use a carrier sense multiple access/collision avoidance (hereinafter referred to as CSMA/CA) as its access protocol.

In a channel access method using the DCF, if a medium is not used during one DCF inter frame space (DIFS) or more (i.e., if the channel is idle during a DIFS), the STA may transmit an MPDU for which the transmission is imminent (or an MPDU that is to be transmitted soon). When it is determined by the carrier sensing mechanism that the wireless medium is being used, the STA may determine the size of the contention window (hereinafter referred to as 'CW') by using a random backoff algorithm and may then perform a backoff procedure.

In order to perform the backoff procedure, STA selects a random time slot within the CW. The selected time slot is referred to as a backoff time. The STA that has selected a relatively short backoff time, among the backoff times that are selected by a plurality of STAs, may acquire a transmission opportunity (hereinafter referred to as 'TXOP'), which allows the corresponding STA to access a medium at a higher priority.

The other STAs may suspend the remaining backoff time and may be on stand-by (or wait) until the transmission of the STA transmitting the frame is completed. Once the frame transmission of the STA is completed, the remaining STAs perform contention with the backoff time so as to be capable of occupying the wireless medium.

The transmission method that is based on the above-described DCF performs the function of preventing collision, which may occur when a plurality of STAs simultaneously transmit frames, from occurring. However, the channel access method using DCF does not have the concept of transmission priority levels. More specifically, when the DCF is used, the quality of service (QoS) of the traffic that is intended to be transmitted by the STA may not be ensured.

In order to resolve the above-described problem, a hybrid coordination function (hereinafter referred to as 'HCF'), which is new coordination function, is defined in 802.11e. The newly defined HCF has a capability (or performance) that is more enhanced than the legacy channel access performance (or capability) of the DCF. For the purpose of enhancing the QoS, the HCF may also use two different types of channel access methods, which correspond to a HCF controlled channel access (HCCA) of a polling method and a contention based enhanced distributed channel access (EDCA).

Traffic categories (hereinafter referred to as 'TC') for the transmission priority levels may be defined in the EDCA and the HCCA. Priority levels for performing channel access may be determined based on the above-described TC.

More specifically, the HCCA scheme uses a hybrid coordinator (hereinafter referred to as 'HC'), which is located in the AP for performing central management of the wireless medium access. Since the HC performs an integrated central management of the wireless medium, contention between the STAs for the wireless medium access may be reduced. Accordingly, since the data frame exchange may be maintained at a short transmission delay time (SIFS), the network efficiency may be enhanced.

The HC defines QoS attributes of a specific traffic being requested by an application service as parameters for QoS support and, then, controls transmission delay and scheduling. Before transmitting the parameterized QoS traffic, the HC first configures a virtual connection, which is referred to as a traffic stream. The traffic stream may be configured for all of an uplink from an STA to the AP, a downlink from the AP to an STA, and a direct link from an STA to another STA.

In order to configure a traffic stream between the AP and an STA, traffic attributes, such as frame size, average transmission speed, and so on, and QoS request parameters, such as delay time, are exchanged through a mutual agreement process. The HC performs a function of controlling allocation of medium access time by using a TXOP.

Referring to FIG. 13, each traffic data being transmitted from the STA may be assigned with a priority level, and a backoff procedure may be performed based on a contention based EDCA method. For example, the priority levels being assigned to each traffic may be divided into 8 different levels. As described above, one STA may have different output queues (or transmission queues) according to the priority levels, and each output queue operates according to the EDCA rule.

Each output queue may transmit traffic data by using a different Arbitration Interframe Space (AIFS) according to each priority level instead of using the conventionally used DCF Interframe Space (DIFS). Additionally, in case an STA is scheduled to transmit traffic each having a different priority level at a same time, collision within the STA may be prevented by performing transmission starting from the traffic having a higher priority level.

Hereinafter, the device according to the exemplary embodiment of this specification may correspond to a device that is capable of supporting both a wireless LAN system and a cellular system. More specifically, the device may be interpreted as a UE supporting a cellular system or an STA supporting a wireless LAN system.

All timing may be decided by referring to physical layer interface primitives, i.e., a PHY-TXEND.confirm primitive, a PHYTXSTART.confirm primitive, a PHY-RXSTART.indication primitive, and a PHY-RXEND.indication primitive.

For simplicity in the description of this specification, a frame interval (IFS) of 802.11 will hereinafter be described. For example, an inter-frame space (or Inter-Frame Spacing) (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

Different IFSs may be determined according to attributes specified by the physical layer of the STA regardless of the bit rate of the STA. An IFS timing may be defined as a time gap within the wireless medium. The IFS timing excluding AIFS is fixed for each physical layer.

For example, the SIFS has the shortest time gap among the IFS mentioned above. Accordingly, the SIFS may be used in a case where an STA occupying a wireless medium is required to maintain its occupation of the medium without any interruption by another STA during a section (or duration), wherein a frame exchange sequence is performed.

More specifically, by using the shortest gap between transmissions within a frame exchange sequence, priority may be assigned (or given) for completing the frame exchange sequence that is currently being performed. Also, an STA performing access to a wireless medium by using the SIFS timing may initiate (or start) transmission from an SIFS boundary without determining whether or not the medium is busy.

A duration of an SIFS for a specific physical (PHY) layer may be defined by an aSIFSTime parameter. For example, in the physical (PHY) layer of the IEEE 802.11a, IEEE 802.11g, IEEE 802.11n, and IEEE 802.11ac standards (or specifications), the SIFS value is equal to 16 μs.

For example, the STA using the PIFS may be assigned with a priority level used in order to provide the STA with a second highest priority level following the priority level of the SIFS. In other words, the PIFS may be used in order to acquire priority for accessing the wireless medium.

For example, the DIFS may be used by an STA transmitting a data frame (MPDU) and a management frame (Mac Protocol Data Unit (MPDU)) based on the DCF. In this case, after the received frame and backoff time are expired, when it is determined by a carrier sense (CS) mechanism that the medium is in an idle state, the STA may transmit a frame.

Figure 14:
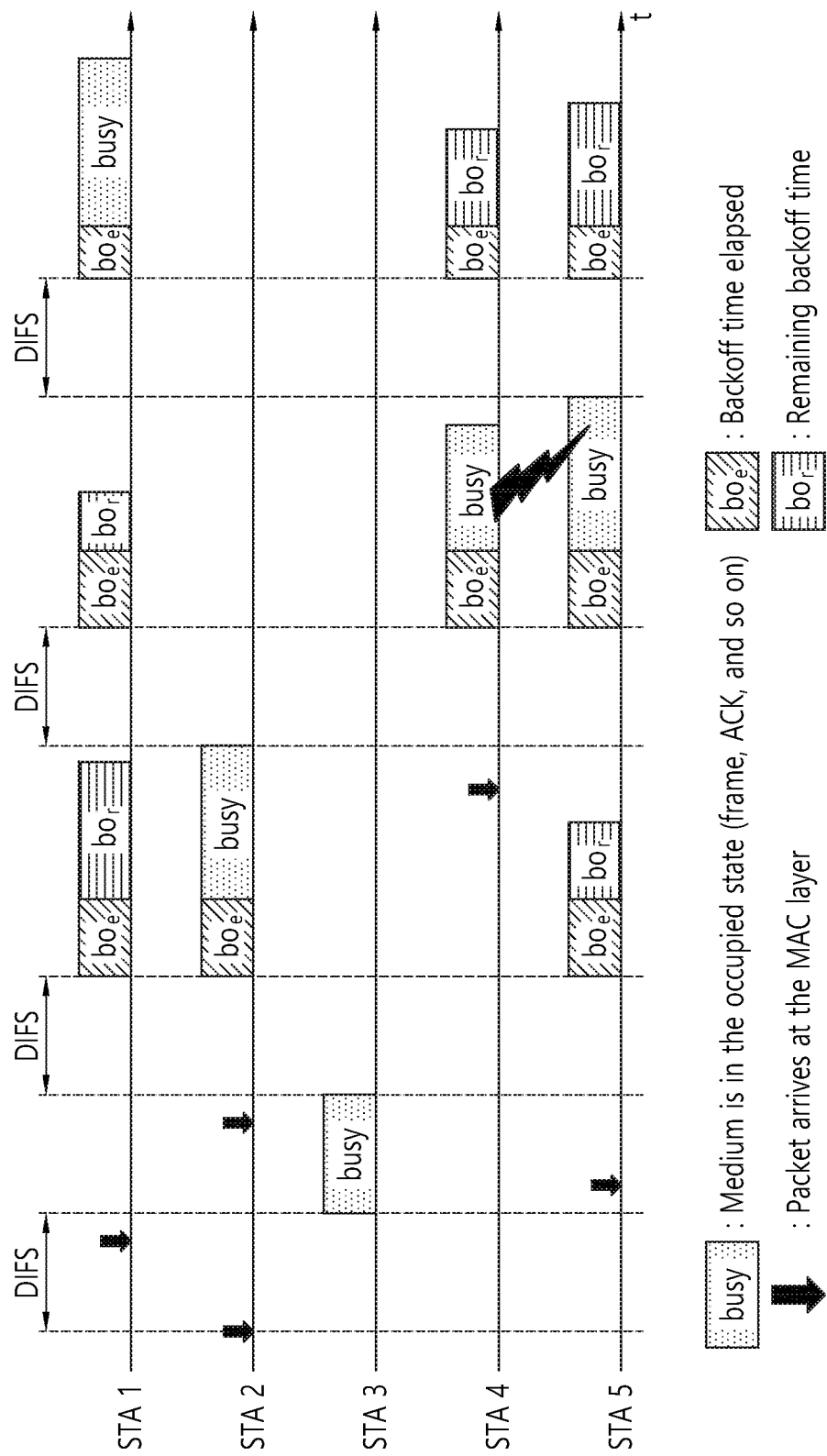
FIG. 14 is a diagram for describing a backoff cycle and a frame transmission procedure in a wireless communication system of this specification.

FIG. 14 is a diagram for describing a backoff cycle and a frame transmission procedure in a wireless communication system of this specification.

Referring to FIG. 12 to FIG. 14, when a specific medium is shifted from an occupy or busy state to an idle state, a plurality of STAs may attempt to perform data (or frame) transmission. At this point, as a solution for minimizing collision between the STAs, each STA may select a random backoff time according to the backoff procedure and may attempt to perform transmission after standing by during a slot time corresponding to the selected random backoff time.

The backoff procedure that is mentioned in this specification may correspond to a concept including the following operations.

In order to attempt to perform channel access, the STA may perform a countdown of the random backoff time, which is configured in the backoff counter. For example, the random backoff time may be determined based on a backoff procedure according to Equation 1 shown below.

Additionally, in case re-transmission is required to be performed due to a transmission collision occurring according to the backoff procedure or due to a failure to receive an ACK frame, the STA may attempt to perform channel access by re-configuring a random backoff time by using Equation 2 shown below.

Each STA may configure a random backoff time (Tb[i]) to a backoff counter, which individually exists in each STA. The random backoff time may be calculated as a pseudo-random integer value by using Equation 1 shown below.

$$T_b[i] = \text{Random}(i) \times \text{SlotTime} \qquad \text{[Equation 1]}$$

Random(i) of Equation 1 refers to a function generating a random integer between 0 and CW[i] by using uniform distribution. CW[i] represents a contention window existing between a minimum contention window CWmin[i] and a maximum contention window CWmax[i], and i represents a traffic priority level. More specifically, i may indicate any one of AC_VO, AC_VI, AC_BE, and AC_BK according to the QoS of the traffic data.

Typically, the value of CWmin[AC] in Table 2 may be configured as the initial CW[i]. It shall be understood that the CWmin[i] and the CWmax[i], which are mentioned above, may respectively correspond to CWmin[AC] and CWmax[AC] of Table 2.

Additionally, in case re-transmission is required to be performed, a new contention window $CW_{new}[i]$ may be calculated by using a previous (or old) window $CW_{old}[i]$ based on Equation 2, which is shown below.

$$CW_{new}[i]=((CW_{old}[i]+1) \times PF)-1 \quad \text{[Equation 2]}$$

Herein, the PF value may be calculated according to a procedure that is defined in the IEEE 802.11e standard. For example, the PF value may be configured to be equal to '2'. The CWmin[i], AIFS[i], and PF values may be transmitted from the AP by using a QoS parameter set element, which corresponds to a management frame. Alternatively, the above-mentioned QoS parameter set element may be configured in advance by the AP and the STA.

The SlotTime of Equation 1 may be used for accommodating variability. The SlotTime of Equation 1 may be used for providing sufficient time so as to allow a preamble of a transmitting STA to be sufficiently discovered by a neighboring STA. The SlotTime of Equation 1 may be used for defining the above-described PIFS and DIFS. For the SlotTime of Equation 1, a SlotTime for a specific physical layer (PHY) may be defined by the aSlotTime parameter. In the physical (PHY) layer of the 802.11a, 802.11g, 802.11n, and 802.11ac standards, the SlotTime value is equal to 9 µs.

Referring to FIG. 14, when a packet for STA3 reaches the MAC layer of STA3, STA3 may determine whether or not the medium is in an idle state during a DIFS and may then immediately transmit a frame. Although the inter frame space (IFS) of FIG. 14 is illustrated as a DIFS, it should be understood that this specification will not be limited only to this.

Meanwhile, the remaining STAs may monitor that the medium is in a busy state and may then be on standby. Meanwhile, data that are to be transmitted to each of STA1, STA2, and STA5 may be generated. Each STA may be on standby for as long as a DIFS and may then perform countdown of an individual random backoff time, which is selected by each STA.

Referring to FIG. 14, a case where the STA2 selects the shortest backoff time and the STA1 selects the longest backoff time are illustrated. FIG. 14 illustrates a case where the remaining backoff time of the STA5, which starts from a time point where STA2 completes backoff counting of its selected random backoff time and initiates frame transmission, is shorter than the remaining backoff time of the STA1.

Subsequently, while the STA2 occupies the medium, the STA1 and the STA5 may suspend the countdown and may then go on standby (or wait). Thereafter, when the medium occupation of the STA2 is completed, and when the STA2 returns to its idle state, the STA1 and the STA5 may go on standby (or wait) for as long as a DIFS and may then resume the countdown of the suspended backoff time. In this case, since the remaining backoff time of the STA5 is shorter than that of the STA1, the STA5 may transmit a frame earlier than the STA1.

Meanwhile, while the STA2 occupies the medium, data that are to be transmitted by the STA4 may reach the MAC layer of the STA4. At this point, when the medium is in the idle state, the STA4 may go on standby for as long as a DIFS and may then count down the remaining random backoff time, which is selected by the STA4.

Subsequently, if the remaining backoff time of the STA5 coincidentally matches with the random backoff time of the STA4, collision may occur between the STA4 and the STA5.

When a collision occurs between the STAs, both the STA4 and the STA5 fail to receive an ACK, and, accordingly, both STAs fails to perform data transmission.

In this case, each of the STA4 and the STA5 may calculate a new contention window ($CW_{new}[i]$) according to Equation 2, which is presented above. Subsequently, each of the STA4 and the STA5 may perform a countdown of the random backoff time, which is selected through a contention window that is newly calculated according to Equation 2, which is presented above.

Meanwhile, the STA1 may go on standby while the medium is in the busy state (or occupied state) due to the transmission of the STA4 and the STA5. Subsequently, when the medium is shifted to the idle state, the STA1 may go on standby for as long as a DIFS and may then resume its backoff counting. Thereafter, the STA1 may transmit a frame when the backoff count exceeds the remaining backoff time.

A CSMA/CA mechanism may also include virtual carrier sensing in addition to physical carrier sensing, wherein the AP and/or STA directly senses the medium.

Virtual carrier sensing is performed to compensate problems that may occur during medium access, such as a hidden node problem, and so on. In order to perform virtual carrier sensing, a MAC of the WLAN system uses a Network Allocation Vector (NAV). The NAV corresponds to a value that is indicated by an AP and/or an STA that is currently using the medium or that has the authority to use the medium to another AP and/or STA, wherein the value indicates the time remaining until the medium returns to its state of being available for usage. Accordingly, a value that is set as the NAV corresponds to a time period during which the usage of the medium is scheduled by the AP and/or STA, which transmits the corresponding frame, and the STA receiving the NAV value is prohibited from accessing the medium during the corresponding time period. For example, the NAV may be configured according to a value of the duration field of the MAC header of the corresponding frame.

Figure 15:
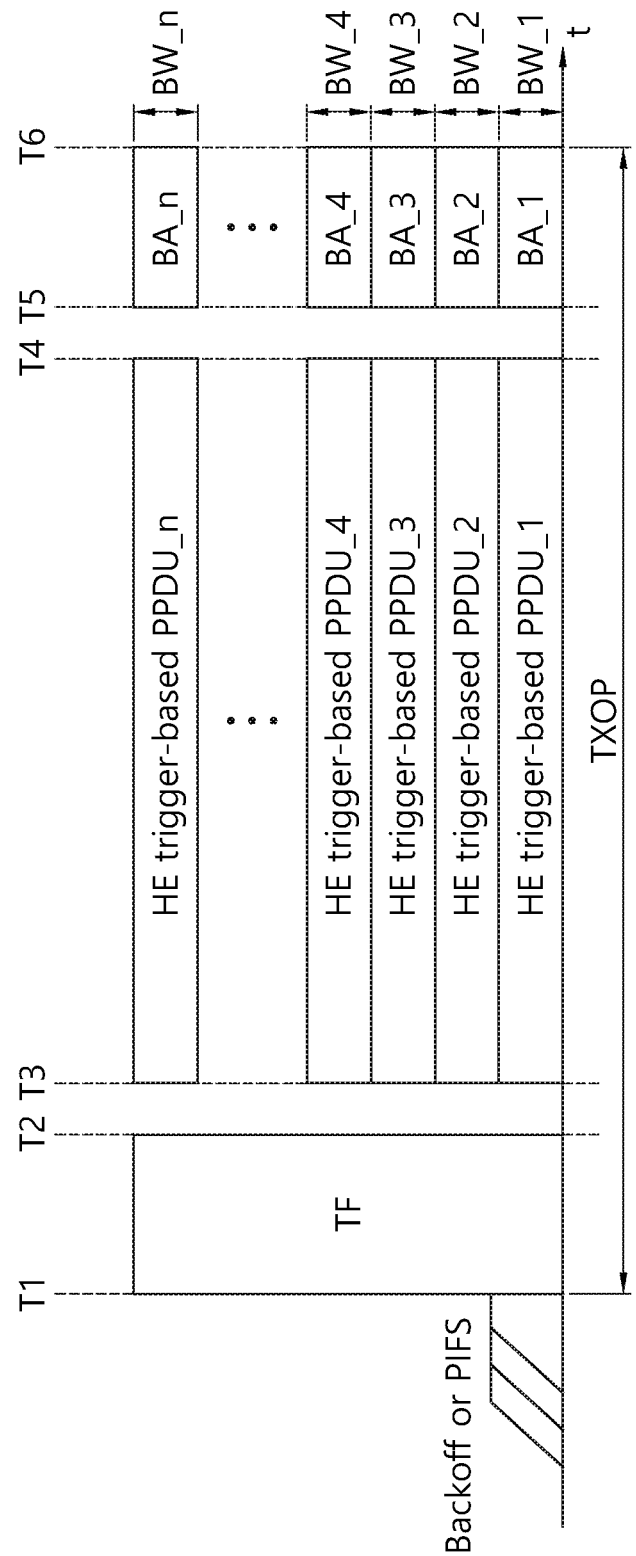
FIG. 15 and FIG. 16 are diagrams for describing an uplink transmission of multiple users according to an exemplary embodiment of this specification.
Figure 16:
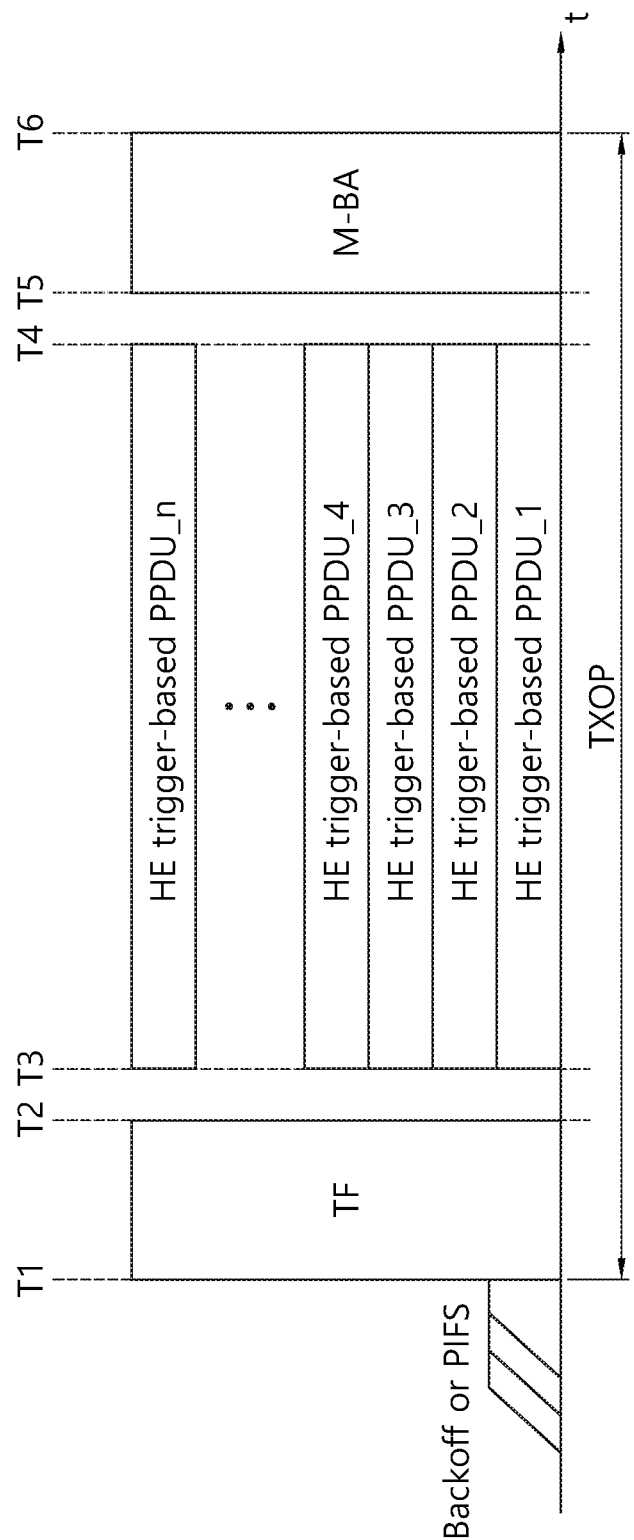

FIG. 15 and FIG. 16 are diagrams for describing an uplink transmission of multiple users according to an exemplary embodiment of this specification.

Referring to FIG. 15, a horizontal axis represents time (t). And, it shall be understood that the vertical axis (not shown) of FIG. 15 may represent a presence or absence of a frame, which is expressed in the viewpoint of the frequency.

An access point (AP) of FIG. 15 may acquire a transmission opportunity through a backoff operation. If it is confirmed by the access point (AP) that a channel is idle during a PCF inter-frame space (PIFS), the AP of FIG. 15 may perform downlink (hereinafter referred to as 'DL') transmission of a trigger frame to a plurality of STAs during a first section (T1~T2) (i.e., a downlink (DL) section).

The trigger frame (TF) of FIG. 15 may correspond to a frame that solicits an uplink frame of multi-users. More specifically, in order to receive a plurality of trigger-based frames from the plurality of STAs, the trigger frame may be transmitted.

The trigger frame may include information (e.g., RU information) being associated with radio resources, which are individually configured (or set up) by the AP for the reception of the plurality of trigger-based frames. Subsequently, the AP and the plurality of STAs may be on standby (or wait) during a second section (T2~T3). For example, the second section (T2~T3) may correspond to a short inter-frame space (SIFS).

Afterwards, the AP may receive the plurality of trigger-based frames from the plurality of STAs. More specifically, first to $n^{th}$ trigger-based PPDUs (HE trigger-based PPDU_1~HE trigger-based PPDU n) of FIG. 15 may be received by the AP through radio resources being allocated by the trigger frame (TF) during an overlapping third section (T3~T4, uplink (UL) section).

For example, the first trigger-based PPDU (HE trigger-based PPDU_1) of FIG. 15 may correspond to a trigger-based frame being transmitted by a first STA. The first trigger-based PPDU (HE trigger-based PPDU_1) may be transmitted through a first bandwidth (BW_1). For example, the first bandwidth (BW_1) may correspond to 20 MHz.

The second trigger-based PPDU (HE trigger-based PPDU_2) of FIG. 15 may correspond to a trigger-based frame being transmitted by a second STA. The second trigger-based PPDU (HE trigger-based PPDU_2) may be transmitted through a second bandwidth (BW_2). For example, the second bandwidth (BW_2) may correspond to 20 MHz.

The third trigger-based PPDU (HE trigger-based PPDU_3) of FIG. 15 may correspond to a trigger-based frame being transmitted by a third STA. The third trigger-based PPDU (HE trigger-based PPDU_3) may be transmitted through a third bandwidth (BW_3). For example, the third bandwidth (BW_3) may correspond to 20 MHz.

The fourth trigger-based PPDU (HE trigger-based PPDU_4) of FIG. 15 may correspond to a trigger-based frame being transmitted by a fourth STA. The fourth trigger-based PPDU (HE trigger-based PPDU_4) may be transmitted through a fourth bandwidth (BW_4). For example, the fourth bandwidth (BW_4) may correspond to 20 MHz.

In other words, in case a plurality of STAs correspond to first to $n^{th}$ STAs (wherein n is an integer), the $n^{th}$ trigger-based PPDU (HE trigger-based PPDU n) of FIG. 15 may correspond to a trigger-based frame being transmitted by the $n^{th}$ STA.

Subsequently, the AP and the plurality of STAs may be on standby during a fourth section (T4~T5). For example, the fourth section (T4~T5) may correspond to a short interframe space (SIFS).

Thereafter, the AP may transmit a plurality of acknowledgement (ACK) frames corresponding to the received plurality of trigger-based frames. The ACK frame of FIG. 15 may correspond to a block ACK (hereinafter referred to as 'BA') frame that can confirm (or verify) the reception of at least one MPDU included in the PPDU.

A plurality BA frames (BA_1~BA_n), which are shown in FIG. 15, may be transmitted through a bandwidth through which the trigger-based frames corresponding to each BA frame are received. The plurality of BA frames (BA_1~BA_n) may be transmitted during a fifth section (T5~T6, downlink (DL) section). For example, a first BA frame (BA_1) may correspond to a first HE trigger-based PPDU (HE trigger-based PPDU 1), and the first BA frame (BA_1) may be transmitted to the first STA through a first bandwidth (BW_1).

For example, a second BA frame (BA_2) may correspond to a second HE trigger-based PPDU (HE trigger-based PPDU_2), and the second BA frame (BA_2) may be transmitted to the second STA through a second bandwidth (BW_2). A third BA frame (BA_3) may correspond to a third HE trigger-based PPDU (HE trigger-based PPDU_3), and the third BA frame (BA_3) may be transmitted to the third STA through a third bandwidth (BW_3).

For example, a fourth BA frame (BA_4) may correspond to a fourth HE trigger-based PPDU (HE trigger-based PPDU_4), and the fourth BA frame (BA_4) may be transmitted to the fourth STA through a fourth bandwidth (BW_4). An $n^{th}$ BA frame (BA_n) may correspond to an $n^{th}$ HE trigger-based PPDU (HE trigger-based PPDU n), and the $n^{th}$ BA frame (BA_n) may be transmitted to the $n^{th}$ STA through an $n^{th}$ bandwidth (BW_n).

As shown in FIG. 15, in order to notify (or announce) the successful reception of the plurality of uplink frames, the AP may transmit a plurality of ACK frames corresponding to each of the plurality of trigger-based frames. Each ACK frame of FIG. 15 may include association identifier (AID) information corresponding to each STA.

Additionally, as shown in FIG. 15, a transmission opportunity (TXOP) section for uplink multi-user (hereinafter referred to as 'UL MU') operations may include the first section to the fifth section (T1~T5).

Information indicating a time length of the transmission opportunity (TXOP) section shown in FIG. 15 may be included in a trigger frame (TF). Accordingly, the STA that has received the trigger frame (TF) may acknowledge the time length of the transmission opportunity (TXOP) section.

Referring to FIG. 16, it should be understood that, with the exception for the part related to the ACK frame, the same description provided in FIG. 15 may be applied for the description of FIG. 16.

However, as shown in FIG. 16, in order to notify (or announce) the successful reception of the plurality of uplink frames (HE trigger-based PPDU_1~HE trigger-based PPDU_n), the AP may transmit one multi-ACK frame (M-BA).

The multi-ACK frame (M-BA) of FIG. 16 may include association identifier (AID) information corresponding to a plurality of STAs.

Additionally, although the user STA has successfully transmitted a plurality of TIDs being included in an uplink frame that is transmitted as a response to the trigger frame, if the user STA fails to transmit part of the TIDs, the user STA may select a random backoff value for the backoff procedure by using the initial value proposed in Table 2.

Figure 17:
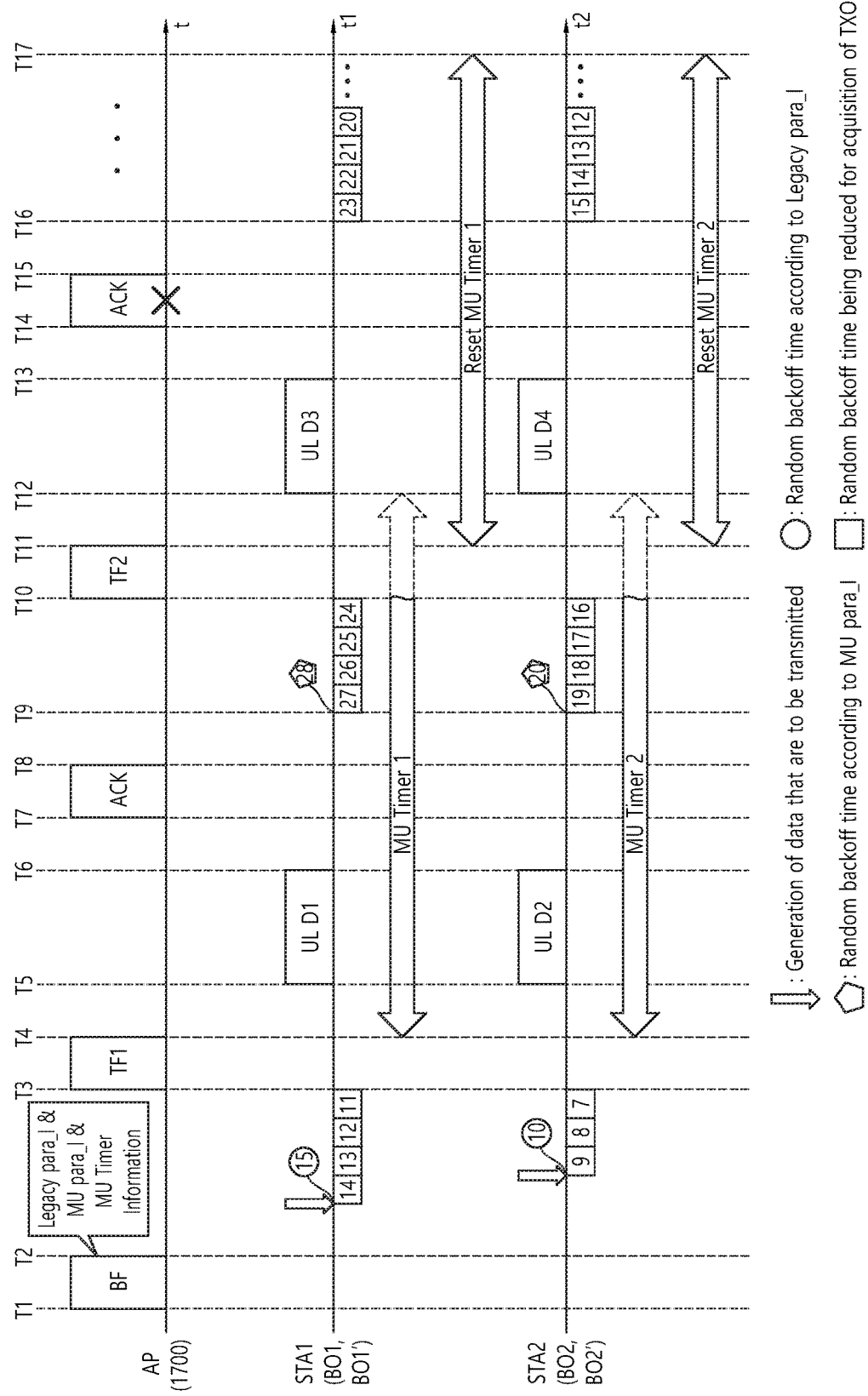
FIG. 17 is a diagram showing an exemplary method for transmitting an uplink frame in a wireless LAN system according to an exemplary embodiment of this specification.

FIG. 17 is a diagram showing an exemplary method for transmitting an uplink frame in a wireless LAN system according to an exemplary embodiment of this specification.

Referring to FIG. 1 to FIG. 17, a horizontal axis of the AP (1700) represents time (t), and the vertical axis represents a presence of frame n, which is expressed in the viewpoint of the frequency. The horizontal axis of the first STA (STA1) represents time (t1), and the vertical axis represents the presence of a frame, which is expressed in the viewpoint of the frequency. The horizontal axis of a second STA (STA2) represents time (t2), and the vertical axis represents the presence of a frame, which is expressed in the viewpoint of the frequency In a first section (T1~T2), the AP (1700) may transmit a beacon frame (hereinafter referred to as a 'BF'). The beacon frame (BF) corresponds to a frame that is periodically transmitted by the AP. The beacon frame (BF) may be transmitted by using a broadcasting method or a multicasting method.

The beacon frame (BF) according to the exemplary embodiment of this specification may include first parameter information for multi-user (MU para_I), second parameter information for a single user (legacy para_I), and timer information (hereinafter referred to as 'MU TI') indicating a valid duration (or section) that can validly use the first parameter information.

The first parameter information (MU para_I) may include a first AIFS value set (AIFS'[AC]) for multi-user, a first CW minimum value set (CWmin'[AC]), and a first CW maximum value set (CWmax'[AC]). The first parameter information (MU para_I) may be applied to a UE following the 802.11 ax standard.

For example, the first AIFS value set (AIFS'[AC]) may include a first value (v1) corresponding to a first access category of the access category background (AC_BK) type, a second value (v2) corresponding to a second access category of the access category best effort (AC_BE) type, a third value (v3) corresponding to a third access category of the access category video (AC_VI) type, and a fourth value (v4) corresponding to a fourth access category of the access category voice (AC_VO) type.

For example, the first CW minimum value set (CWmin'[AC]) may include a fifth value (v5) corresponding to a first access category of the AC_BK type, a sixth value (v6) corresponding to a second access category of the AC_BE type, a seventh value (v7) corresponding to a third access category of the AC_VI type, and an eighth value (v8) corresponding to a fourth access category of the AC_VO type.

For example, the first CW maximum value set (CWmax'[AC]) may include a ninth value (v9) corresponding to a first access category of the AC_BK type, a tenth value (v10) corresponding to a second access category of the AC_BE type, an eleventh value (v11) corresponding to a third access category of the AC_VI type, and a twelfth value (v12) corresponding to a fourth access category of the AC_VO type.

The second parameter information (legacy para_I) may correspond to information for a single user. The second parameter information (legacy para_I) may include a second AIFS value set (AIFS[AC]) for operations of a Quality of Service (QoS) facility (or function), a second CW minimum value set (CWmin[AC]), and a second CW maximum value set (CWmax[AC]).

The second parameter information (legacy para_I) may be applied not only to a UE following the 802.11 ax standard but also to a UE following a previous standard of the IEEE 802.11 ax (e.g., IEEE a/g/n/ac) (hereinafter referred to as a 'legacy UE'). Referring to Table 2, which is presented above, the second AIFS value set (AIFS[AC]) may include a thirteenth value (v13) corresponding to a first access category of the AC_BK type, a fourteenth value (v14) corresponding to a second access category of the AC_BE type, a fifteenth value (v15) corresponding to a third access category of the AC_VI type, and a sixteenth value (v16) corresponding to a fourth access category of the AC_VO type.

For example, the second CW minimum value set (CWmin[AC]) may include a seventeenth value (v17) corresponding to a first access category of the AC_BK type, an eighteenth value (v18) corresponding to a second access category of the AC_BE type, a nineteenth value (v19) corresponding to a third access category of the AC_VI type, and a twentieth value (v20) corresponding to a fourth access category of the AC_VO type.

For example, the second CW maximum value set (CWmax[AC]) may include a twenty-first value (v21) corresponding to a first access category of the AC_BK type, a twenty-second value (v22) corresponding to a second access category of the AC_BE type, a twenty-third value (v23) corresponding to a third access category of the AC_VI type, and a twenty-fourth value (v24) corresponding to a fourth access category of the AC_VO type.

According to the exemplary embodiment of this specification, in the viewpoint of fairness in the channel contention of the UE, the value included in the first parameter information for multi-users (MU para_I) may be configured to be greater than the value included in the second parameter information for the legacy EDCA operation (legacy para_I).

For example, Table 3 corresponding to the first parameter information (MU para_I) may configured as shown below. It will be assumed that the value sets (CWmin'[AC], CWmax'[AC], AIFS'[AC]) included in the first parameter information (MU para_I) of Table 3 are two times greater than the value sets (CWmin[AC], CWmax[AC], AIFS[AC]) included in the second parameter information (legacy para_I).

TABLE 3

| AC | CWmin'[AC] | CWmax'[AC] | AIFS'[AC] | MU Timer[AC] |
|---|---|---|---|---|
| AC_BK | 62 | 2046 | 14 | tv1 |
| AC_BE | 62 | 2046 | 6 | tv2 |
| AC_VI | 30 | 62 | 4 | tv3 |
| AC_VO | 14 | 30 | 4 | tv4 |

Referring to Table 3, which is presented above, the first value (v1) may be equal to '14', the second value (v2) may be equal to '6', the third value (v3) may be equal to '4', and the fourth value (v4) may be equal to '4'. Additionally, the fifth value (v5) may be equal to '62', the sixth value (v6) may be equal to '62', the seventh value (v7) may be equal to '30', and the eight value (v8) may be equal to '14'. Furthermore, the ninth value (v9) may be equal to '2046', the tenth value (v10) may be equal to '2046', the eleventh value (v11) may be equal to '62', and the twelfth value (v12) may be equal to '30'.

Referring to Table 2, which is presented above, the thirteenth value (v13) may be equal to '7', the fourteenth value (v14) may be equal to '3', the fifteenth value (v15) may be equal to '2', and the sixteenth value (v4) may be equal to '2'. Additionally, the seventeenth value (v17) may be equal to '31', the eighteenth value (v18) may be equal to '31', the nineteenth value (v19) may be equal to '15', and the twentieth value (v20) may be equal to '7'. Furthermore, the twenty-first value (v21) may be equal to '1023', the twenty-second value (v22) may be equal to '1023', the twenty-third value (v23) may be equal to '31', and the twenty-fourth value (v24) may be equal to '15'.

More specifically, the first value (v1) may be configured to be greater than the thirteenth value (v13), the second value (v2) may be configured to be greater than the fourteenth value (v14), the third value (v3) may be configured to be greater than the fifteenth value (v15), and the fourth value (v4) may be configured to be greater than the sixteenth value (v16).

Additionally, the fifth value (v5) may be configured to be greater than the seventeenth value (v17), the sixth value (v6) may be configured to be greater than the eighteenth value (v18), the seventh value (v7) may be configured to be greater than the nineteenth value (v19), and the eighth value (v8) may be configured to be greater than the twentieth value (v20).

Furthermore, the ninth value (v9) may be configured to be greater than the twenty-first (v21), the tenth value (v10) may be configured to be greater than the twenty-second value (v22), the eleventh value (v11) may be configured to be greater than the twenty-third value (v23), and the twelfth value may be configured to be greater than the twenty-fourth value (v24).

However, the values of the value shown in Table 3 are merely exemplary. And, therefore, it should be understood that this specification will not be limited only to this.

The timer information (MU TI) (e.g., MU Timer[AC] of Table 3) may indicate a valid duration (or section) that can be validly used by the first parameter information (MU para_I). More specifically, the timer information may be configured to indicate a time section (or time duration) having a predetermined value starting from a reception point of the trigger frame.

For example, a first timer value (tv1) corresponding to a first access category of the AC_BK type, a second timer value (tv2) corresponding to a second access category of the AC_BE type, a third timer value (tv3) corresponding to a third access category of the AC_VI type, and a fourth timer value (tv4) corresponding to a fourth access category of the AC_VO type.

The capability of each user STA according to the first and second parameter information (MU para_I, legacy para_I) may be determined during the association step, wherein the user STA and the AP are associated.

For simplicity in the description of FIG. 17, it will be assumed that the first and second user STAs (STA1, STA2) are capable of performing uplink transmission according to the first parameter information (MU para_I). Additionally, it will also be assumed that the first and second user STAs (STA1, STA2) are capable of performing the legacy EDCA type channel access according to the second parameter information.

Moreover, in the exemplary embodiment of FIG. 17, although it is described that the first parameter information (MU para_I), the second parameter information (legacy para_I), and the timer information (MU TI) are signaled to each STA through a beacon frame, it shall be understood that the first parameter information (MU para_I), the second parameter information (legacy para_I), and the timer information (MU TI) may correspond to information that is pre-configured in each user STA according to a provisioning method.

In the second section (T2~T3), when the data reach the MAC layer, in order to initiate the backoff counter procedures (BO1, BO2), each user STA (STA1, STA2) may configure a random backoff timer (RBT), which is calculated based on the second parameter information (legacy para_I), Equation 1, and Equation 2, to a backoff counter of each user STA (STA1, STA2).

For simplicity in the description of FIG. 17, it will be assumed that the QoS information of the data that have reached the MAC layer of each user STA (STA1, STA2) indicates the AC_VI type. In other words, it will be assumed that each user STA (STA1, STA2) attempts to separately transmit an AC_VI type frame during a time section (or duration) of FIG. 17 apart from the uplink transmission according to the trigger frame.

Additionally, during the second section (T2~T3), the attempt of each user STA (STA1, STA2) for performing uplink transmission may be assumed as an initial transmission attempt.

A value '15' may be set to a contention window (CW[i]) for each user STA (STA1, STA2) according to the nineteenth value (v19) corresponding to CWmin[AC_VI] of Table 2.

In order to perform the first backoff procedure (BO1) according to the second parameter information (legacy para_I), a random function (Random(i)) of STA1 may randomly select an integer value within a range starting from '0' to '15'. For example, since the first user STA (STA1) of FIG. 17 sets the random value to '15', the random backoff time (RBT) of STA1 may be equal to 15 slots.

Subsequently, the first user STA (STA1) may perform countdown of the random backoff time (RBT) up to a point before a transmission point (T3) of the trigger frame. For example, the first user STA (STA1) may reduce 4 slots until a point before the transmission point (T3) of the trigger frame.

In order to perform the second backoff procedure (BO2) according to the second parameter information (legacy para_I), a random function (Random(i)) of the second STA (STA2) may randomly select an integer value within a range starting from '0' to '15'. For example, since the second user STA (STA2) of FIG. 17 sets the random value to '10', the random backoff time (RBT) of STA2 may be equal to 10 slots.

Subsequently, the second user STA (STA2) may perform countdown of the random backoff time (RBT) up to a time before the transmission point (T3) of the trigger frame. For example, the second user STA (STA2) may reduce 3 slots until a point before the transmission point (T3) of the trigger frame.

In this specification, the first and second backoff procedures (BO1', BO2') according to the first parameter information (MU para_I) and the first and second backoff procedures (BO1, BO2) according to the second parameter information (legacy para_I) may be understood as separate procedures that are respectively independent from one another.

Moreover, the backoff procedures (BO1, BO2) according to the second parameter information (legacy para_I), which are performed before a transmission point (T3) of a first trigger frame (TF1) of FIG. 17, may be understood as procedures that are independent from the uplink transmission operation that is performed according to the reception of the trigger frame.

Furthermore, the backoff procedures (BO1', BO2') according to the first parameter information (MU para_I), which are performed starting from a time point (T9), at which the uplink transmission corresponding to the first trigger frame of FIG. 17 is completed, up to a point before a transmission point (T10) of a second trigger frame (TF2) of FIG. 17, may be understood as procedures that are independent from the uplink transmission operation that is performed according to the reception of the trigger frame.

More specifically, the backoff procedures (BO1, BO2, BO1', BO2') being performed by each user STA (STA1, STA2) may correspond to procedures capable of transmitting data frames that are currently in possession by actively accessing the channel, instead of the procedures that passively wait for the reception of the trigger frame, to the AP or procedures being performed for transmitting a buffer status report (BSR) for announcing (or notifying) the buffer status of each STA to the AP.

During the third section (T3~T4), the first and second user STAs (STA1, STA2) may receive the first trigger frame (TF1). It will be assumed that the first trigger frame (TF1) includes identification information of the first and second user STA (STA1, STA2).

When it is indicated by the carrier sensing (CS) mechanism that the wireless medium is busy, each user STA (STA1, STA2) may suspend the countdown operation of the backoff procedures (BO1, BO2) according to the second parameter information (legacy para_I).

Each user STA (STA1, STA2) that has detected (or sensed) the reception of the first trigger frame (TF1) may suspend the countdown operation of the first and second backoff procedures (BO1, BO2) according to the second parameter information (legacy para_I) at a third time point (T3) of FIG. 17.

When the first trigger frame (TF1) is received from the AP (1700), each user STA (STA1, STA2) may re-configure the backoff counter for the backoff procedures (BO1', BO2') according to the first parameter information (MU para_I).

For example, a value '30' may be set to a contention window (CW[i]) for each user STA (STA1, STA2) according to the seventh value (v7) corresponding to CWmin'[AC_VI] of Table 3.

In order to initiate the countdown operation for the first and second backoff procedures (BO1', BO2') according to the first parameter information (MU para_I), initiation conditions may be further required. This will be described later on in more detail.

When the first trigger frame (TF1) is received, each user STA (STA1, STA2) may initiate a timer operation based on the timer information (MU TI), which has already been received. More specifically, each user STA (STA1, STA2) may perform the timer operation during a valid interval (or duration), which is indicated according to the third timer value (tv3).

Each user STA (STA1, STA2) may determine the reception or non-reception of the subsequent trigger frame during the valid interval (or duration). If a subsequent trigger frame is received during the valid interval, each user STA (STA1, STA2) may reset the timer operation. Conversely, if a subsequent trigger frame is not received during the valid interval, each user STA (STA1, STA2) may re-configure the backoff counter according to the second parameter information (legacy para_I).

For example, the valid interval (or duration), which is indicated according to the third timer value (tv3) of each user STA (STA1, STA2), may correspond to a predetermined section (or duration) (T4~T12). The user STA may validly use the first parameter information (MU para_I) during the predetermined section (T4~T12).

In other words, during a time section after the predetermined section (T4~T12), each user STA (STA1, STA2) may use the second parameter information (legacy para_I) in order to perform the countdown operation for transmitting the uplink frame.

During a fourth section (T4~T5), the AP (1700) and each user STA (STA1, STA2) may be on standby (or wait) for a predetermined period of time starting from a time point (T4) at which the transmission of the first trigger frame is completed. For example, the fourth section (T4~T5) may correspond to a short inter-frame space (SIFS).

As described above, the timer operation of each user STA (STA1, STA2) according to the exemplary embodiment of this specification may be initiated starting from the time point (T4) at which the transmission of the first trigger frame is completed.

During a fifth section (T5~T6), each user STA (STA1, STA2) may transmit first and second uplink frames (UL D1, UL D2) to the AP (1700).

For example, the first and second uplink frames (UL D1, UL D2) may correspond to trigger-based frames that are separately (or individually) transmitted to the AP (1700) by each user STA (STA1, STA2) as a response to the first trigger frame (TF1).

More specifically, the first and second uplink frames (UL D1, UL D2) of FIG. 17 may correspond to frames that are transmitted during an overlapping time section (or duration) by using separately configured radio resources.

More specifically, the first and second uplink frames (UL D1, UL D2) may correspond to trigger-based PPDUs including at least one MAC protocol data unit (MPDU).

During a sixth section (T6~T7), the AP (1700) and each user STA (STA1, STA2) may be on standby (or wait) for a predetermined period of time starting from a time point (T6) at which the transmission of the first and second uplink frames (UL D1, UL D2) is completed. For example, the sixth section (T6~T7) may correspond to a short inter-frame space (SIFS).

During a seventh section (T7~T8), each user STA (STA1, STA2) may be on standby (or wait) in order to receive an ACK frame that announces (or notified) successful reception of first and second uplink frames (UL D1, UL D2). For example, in FIG. 17, the ACK frame may correspond to a Block ACK (BA) frame or a plurality of ACK frames corresponding to each of the first and second uplink frames.

The ACK frame of FIG. 17 may correspond to a frame for notifying (or announcing) a successful reception of at least one MPDU being included in the trigger-based PPDU. In the seventh section (T7~T8) of FIG. 17, it will be assumed that the ACK frame being transmitted by the AP (1700) is successfully received by each user STA (STA1, STA2).

Accordingly, each user STA (STA1, STA2) may confirm (or verify) the successful transmission of the first and second uplink frames (UL D1, UL D2) by transmitting a response to the first trigger frame (TF1).

During an eighth section (T8~T9), the AP (1700) and each user STA (STA1, STA2) may be on standby (or wait) in order to determine whether or not the channel status is idle during a predetermined period of time starting from the time point (T8) at which the ACK frame transmission is completed.

For example, the eighth section (T8~T9) may correspond to an arbitration inter-frame space (AIFS), a DCF inter-frame space (DIFS), an extended inter-frame space (EIFS), a PCF inter-frame space (PIFS), a reduced inter-frame space (RIFS), or a short inter-frame space (SIFS).

Additionally, each user STA (STA1, STA2) that has successfully transmitted the first and second uplink frames (UL D1, UL D2) may determine the validity of the first parameter information (MU para_I) based on the timer information (MU TI).

In the following description, it will be assumed that each user STA (STA1, STA2) successfully transmits the first and second uplink frames (UL D1, UL D2) and that each user STA (STA1, STA2) corresponds to a device for which the validity of the first parameter information (MU para_I) has been confirmed (or verified) according to the timer information (MU TI).

However, unlike the example shown in the drawing of FIG. 17, it will be understood that each user STA (STA1, STA2) that has successfully received the ACK frame may by-pass the eighth section (T8~T9).

During the ninth section (T9~T10), each user STA (STA1, STA2) may initiate the countdown operation of the first and second backoff procedures (BO1', BO2'), which are configured according to the first parameter information (MU para_I).

As described above, since a ninth time point (T9) is included in the predetermined section (T4~T12), which is indicated according to the third timer value (tv3), each user STA (STA1, STA2) may validly use the first parameter information (MU para_I).

The first user STA (STA1) that has successfully transmitted the first uplink frame (UL D1) may initiate a first backoff procedure (BO1'), which is configured according to the first parameter information (MU para_I).

Similarly, the second user STA (STA2) that has successfully transmitted the second uplink frame (UL D2) may initiate a second backoff procedure (BO2'), which is configured according to the first parameter information (MU para_I).

The first and second user STAs (STA1, STA2) may randomly select an integer value within a range starting from '0' to '30' by using a random function (Random(i)).

For example, since the first user STA (STA1) of FIG. 17 sets the random value to '28', the random backoff time (RBT) of the first user STA (STA1) may be equal to 28 slots.

Subsequently, the first user STA (STA1) may perform countdown of the random backoff time (RBT) up to a time before the transmission point (T10) of the second trigger frame (TF2). For example, the first user STA (STA1) may reduce 4 slots until a point before the transmission point (T10) of the second trigger frame (TF2).

For example, since the second user STA (STA2) of FIG. 17 sets the random value to '20', the random backoff time (RBT) of STA2 may be equal to 20 slots.

Subsequently, the second user STA (STA2) may perform countdown of the random backoff time (RBT) up to a time before the transmission point (T10) of the second trigger frame (TF2). For example, the second user STA (STA2) may reduce 4 slots until a point before the transmission point (T10) of the second trigger frame (TF2).

During a tenth section (T10~T11), the first and second user STAs (STA1, STA2) may receive the second trigger frame (TF2). It will be assumed that the second trigger frame (TF2) includes identification information of the first and second user STA (STA1, STA2).

When it is indicated by the carrier sensing (CS) mechanism that the wireless medium is busy, each user STA (STA1, STA2) may suspend the countdown operation of the backoff procedures (BO1', BO2') according to the first parameter information (MU para_I).

Each user STA (STA1, STA2) that has detected (or sensed) the reception of the second trigger frame (TF2) may suspend the countdown operation of the first and second backoff procedures (BO1', BO2') according to the first parameter information (MU para_I) of FIG. 17.

In case of FIG. 17, since the second trigger frame is received before the timer operation of each user STA (STA1, STA2) is expired, each user STA (STA1, STA2) may reset the timer operation based on the timer information (MU TI), which has already been received.

For example, a valid interval (or duration) of the reset timer operation may correspond to a predetermined section. In other words, during the reset valid interval (T11~T17), each user STA (STA1, STA2) may continue to use the first parameter information (MU para_I).

During an eleventh section (T11~T12), the AP (1700) and each user STA (STA1, STA2) may be on standby (or wait) for a predetermined period of time starting from a time point (T11) at which the transmission of the second trigger frame (TF2) is completed. For example, the eleventh section (T11~T12) may correspond to a short inter-frame space (SIFS). As described above, the reset timer operation according to the exemplary embodiment of this specification may be initiated starting from the time point (T11) at which the transmission of the second trigger frame (TF2) is completed.

During a twelfth section (T12~T13), each user STA (STA1, STA2) may transmit third and fourth uplink frames (UL D3, UL D4) to the AP (1700).

For example, the third and fourth uplink frames (UL D3, UL D4) may correspond to trigger-based frames that are separately (or individually) transmitted to the AP (1700) by each user STA (STA1, STA2) as a response to the second trigger frame (TF2).

More specifically, the third and fourth uplink frames (UL D3, UL D4) of FIG. 17 may correspond to frames that are transmitted during an overlapping time section (or duration) by using separately configured radio resources.

More specifically, the third and fourth uplink frames (UL D3, UL D4) may correspond to trigger-based PPDUs including at least one MAC protocol data unit (MPDU).

During a thirteenth section (T13~T14), the AP (1700) and each user STA (STA1, STA2) may be on standby (or wait) for a predetermined period of time starting from a time point (T14) at which the transmission of the third and fourth uplink frames (UL D3, UL D4) is completed. For example, the thirteenth section (T13~T14) may correspond to a short inter-frame space (SIFS).

During a fourteenth section (T14~T15), each user STA (STA1, STA2) may be on standby (or wait) in order to receive an ACK frame that announces (or notified) successful reception of third and fourth uplink frames (UL D3, UL D4).

In the fourteenth section (T14~T15) of FIG. 17, it is shown that the ACK frame is not received by each user STA (STA1, STA2). In case the ACK frame is not received from the AP (1700), diverse causes may exist for such non-reception of the ACK frame.

For example, the AP (1700) may actually fail to receive an uplink frame due to a channel status according to the surrounding environment, or the uplink frame may fail to be transmitted due to a collision between the user STAs. As another example, the ACK frame may fail to be received due to inappropriate (or unsuitable) configuration of transmission power (TX power) or modulation coding scheme (MCS) values of the AP or the STA(s).

During a fifteenth section (T15~T16), each user STA (STA1, STA2) may determine whether or not the channel status is idle during a predetermined period of time. For example, the fifteenth section (T15~T16) may correspond to an arbitration inter-frame space (AIFS), a DCF inter-frame space (DIFS), an extended inter-frame space (EIFS), a PCF inter-frame space (PIFS), a reduced inter-frame space (RIFS), or a short inter-frame space (SIFS).

Additionally, when it is determined that the channel status is idle during the fifteenth section (T15~T16), each STA (STA1, STA2) may resume the backoff count of the suspended backoff procedures (BO1', BO2').

For example, the first user STA (STA1) may resume the countdown operation for the suspended 24 slots in the backoff counter of the first backoff procedure (BO1'). Similarly, the second user STA (STA2) may resume the countdown operation for the suspended 16 slots in the backoff counter of the second backoff procedure (BO2').

In summary, in case the uplink transmission, which is performed based on the first parameter information (MU para_I), has failed, the user STA according to the exemplary embodiment of this specification may resume the countdown operation based on a value of the suspended backoff counter according to the reception of a trigger frame without any exponential increase in the contention window (CW[i]) according to Equation 2.

Figure 18:
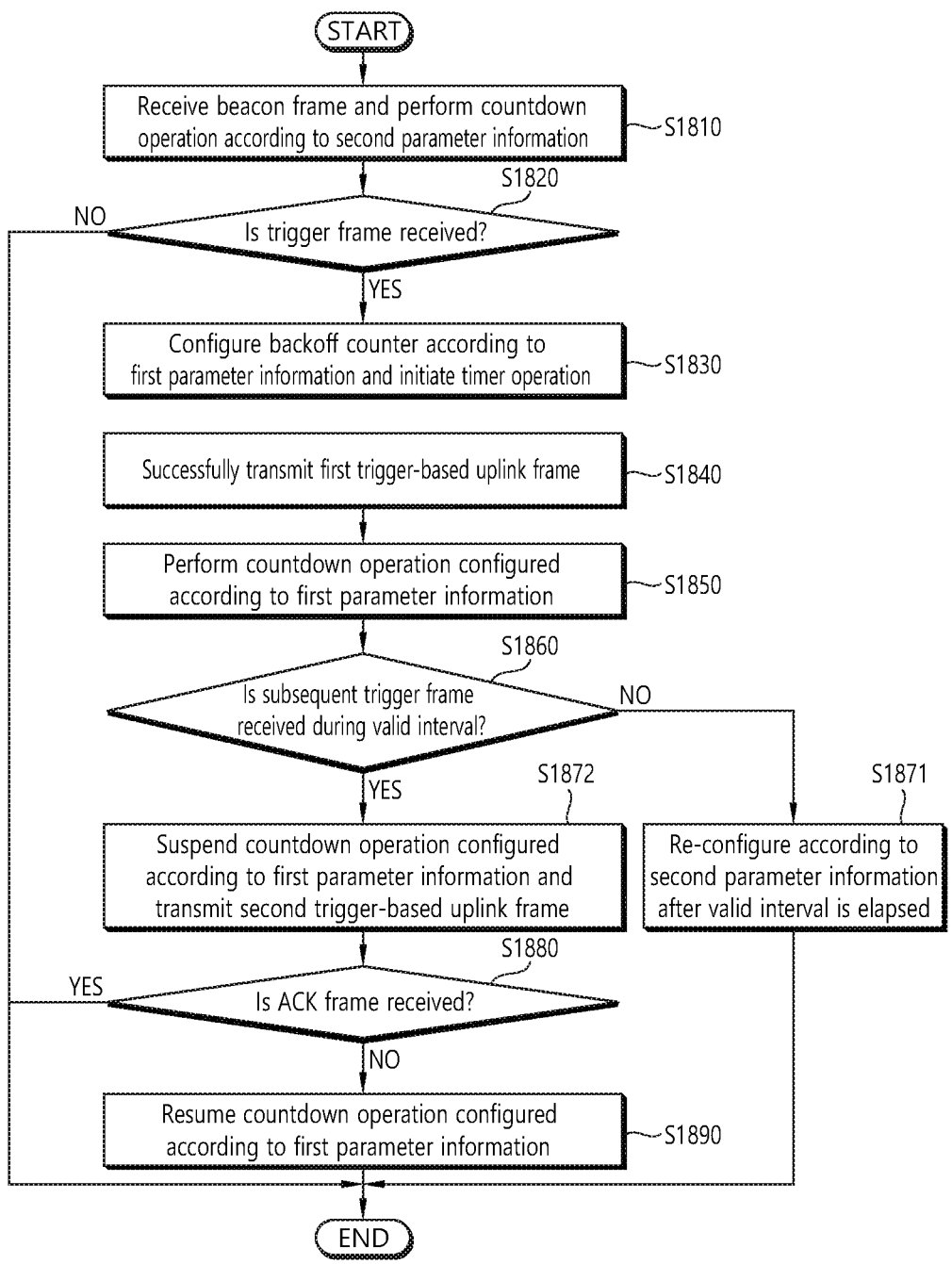
FIG. 18 is a flow chart showing an exemplary method for transmitting an uplink frame in a wireless LAN system according to an exemplary embodiment of this specification.

FIG. 18 is a flow chart showing an exemplary method for transmitting an uplink frame in a wireless LAN system according to an exemplary embodiment of this specification. Referring to FIG. 17 and FIG. 18, in step S1810, the user STA according to the exemplary embodiment of this specification may receive a beacon frame (BF), which is transmitted by the AP.

For example, the beacon frame (BF) may include first parameter information for multi-user (MU para_I), second parameter information for a single user (legacy para_I), and timer information (MU TI) indicating a valid duration (or section) that can validly use the first parameter information.

The first parameter information (MU para_I) may include a first AIFS value set (AIFS'[AC]) for multi-user, a first contention window (CW) minimum value set, and a first CW maximum value set.

The second parameter information (legacy para_I) may include a second AIFS value set (AIFS[AC]) for operations of a Quality of Service (QoS) facility (or function), a second CW minimum value set, and a second CW maximum value set.

The user STA that has received the beacon frame (BF) may perform countdown operations by using a backoff counter, which is configured according to the second parameter information (legacy para_I), until a point before the trigger frame is received.

In step S1820, the user STA may determine the reception or non-reception of a trigger frame (TF) after the reception of the beacon frame (BF). In case the trigger frame (TF) is not received, the procedure is ended (or terminated). If the trigger frame (TF) is received, the user STA may suspend the countdown operation of the backoff procedure according to the second parameter (legacy para_I).

Additionally, when the trigger frame (TF) is received, the user STA may configure the countdown operation of the backoff procedure according to the first parameter information (MU para_I). When the trigger frame (TF) is received, the procedure proceeds to step S1830.

In step S1830, the user STA may configure a backoff counter for the countdown operation according to the first parameter information (MU para_I). Additionally, when the trigger frame (TF) is received, the user STA may initiate the timer operation based on the timer information (MU TI), which has already been received. More specifically, the user STA may perform the timer operation during the valid interval (or duration), which is indicated according to a timer value that is included in the timer information (MU TI).

In step S1840, the user STA may transmit a first trigger-based uplink frame to the AP as a response to the trigger frame. Subsequently, the user STA may receive an ACK frame notifying (or announcing) the successful reception of the first trigger-based uplink frame from the AP.

In step S1850, the user STA may determine whether or not the channel state is idle during a predetermined time period starting from a time point at which the transmission of the ACK frame is completed. For example, if it is determined that the channel state is idle during the predetermined time period, the user STA may start (or initiate) the countdown operation by using the backoff counter, which is configured according to the first parameter information (MU para_I).

Additionally, the user STA may determine the validity of the first parameter information (MU para_I) based on the timer information (MU TI) after the time point at which the transmission of the ACK frame is completed. For example, when it is determined that the first parameter information (MU para_I) is valid, the user STA may start (or initiate) the countdown operation of the backoff counter, which is configured according to the first parameter information (MU para_I).

In step S1860, the user STA may determine whether or not a subsequence trigger frame (TF') is received during the valid interval (or duration), which is indicated according to the timer value that is included in the timer information (MU TI). If the subsequent trigger frame (TF') is not received during the valid interval, the procedure proceeds to step S1871.

In step S1871, after the valid interval is passed, the user STA may re-configure the backoff counter for the countdown operation according to the second parameter information (legacy para_I).

In step S1872, if the subsequent trigger frame (TF') is received during the valid interval, the user STA may suspend the countdown operation, which is configured according to the first parameter information (MU para_I). Additionally, by using the resource unit that is allocated through the subsequent trigger frame (TF'), the user STA may transmit a second trigger-based uplink frame.

In step S1880, the user STA may determine the reception or non-reception of an ACK frame for the second trigger-based uplink frame. If the ACK frame for the second trigger-based uplink frame is received, the procedure is terminated (or ended). And, if the ACK frame for the second trigger-based uplink frame is not received, the procedure proceeds to step S1890.

In step S1890, the user STA may resume the countdown operation, which is configured according to the first parameter information (MU para_I).

If the uplink transmission is failed, the value the is configured to the backoff counter according to the related art parameter information for multi-users increases exponentially. Conversely, if the uplink transmission is failed, the user STA according to the exemplary embodiment of this specification may resume the countdown procedure based on the value, which is configured to the backoff counter of the suspended countdown procedure.

As described above, by configuring the value set corresponding to the parameter information for multi-users (e.g., Table 3) to have values greater than the value set corresponding to the legacy parameter information (e.g., Table 2), the priority levels of channel access between the device following the IEEE 802.11 ax standard and the legacy device may be adjusted.

Additionally, by configuring a TXOP limit value for the device following the IEEE 802.11 ax standard to be smaller than the TXOP limit value for the legacy device, the priority levels of channel access between the device following the IEEE 802.11 ax standard and the legacy device may be adjusted.

According to the exemplary embodiment of this specification, when an uplink frame is transmitted based on parameter information for multi-users, and when re-transmission is performed according to a transmission failure of the uplink frame, in the viewpoint of fairness in the transmission opportunity (TXOP) between the legacy device and the device following the IEEE 802.11 ax standard, in order to prevent the opportunity of the channel access from being excessively reduced, the user STA following the IEEE 802.11 ax standard may not exponentially increase the size of the contention window.

Accordingly, according to the exemplary embodiment of this specification, a wireless LAN (WLAN) system having enhanced overall capability (or performance) in a viewpoint of fairness in the transmission opportunity may be provided.

Figure 19:
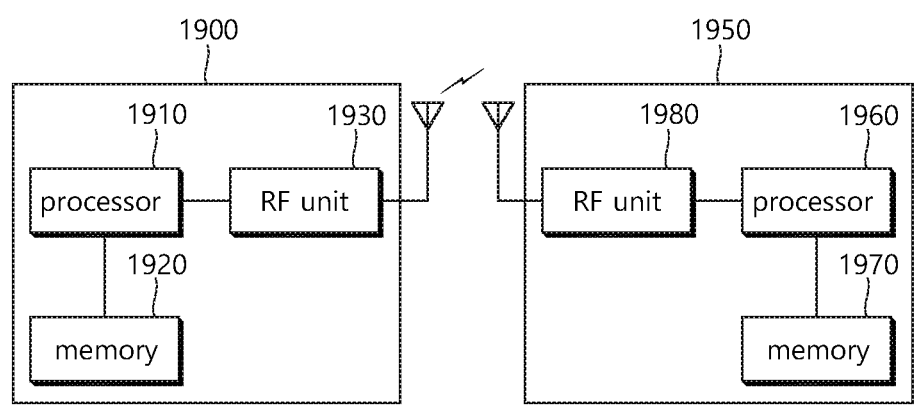
FIG. 19 is a block view illustrating a wireless device to which the exemplary embodiment of this specification invention can be applied.

FIG. 19 is a block view illustrating a wireless device to which the exemplary embodiment of this specification can be applied. Referring to FIG. 19, as an STA that can implement the above-described exemplary embodiment, the wireless device may correspond to an AP or a non-AP station (STA). The wireless device may correspond to the above-described user or may correspond to a transmitting device transmitting a signal to the user.

The AP (1900) includes a processor (1910), a memory (1920), and a radio frequency (RF) unit (1930).

The RF unit (1930) is connected to the processor (1910), thereby being capable of transmitting and/or receiving radio signals.

The processor (1910) implements the functions, processes, and/or methods proposed in this specification. For example, the processor (1910) may be implemented to perform the operations according to the above-described exemplary embodiments of this specification. More specifically, among the operations that are disclosed in the exemplary embodiments of FIG. 1 to FIG. 18, the processor (1910) may perform the operations that may be performed by the AP.

The non-AP STA (1950) includes a processor (1960), a memory (1970), and a radio frequency (RF) unit (1980).

The RF unit (1980) is connected to the processor (1960), thereby being capable of transmitting and/or receiving radio signals.

The processor (1960) implements the functions, processes, and/or methods proposed in this specification. For example, the processor (1960) may be implemented to perform the operations of the non-AP STA according to the above-described exemplary embodiments of this specification. The processor may perform the operations of the non-AP STA, which are disclosed in the exemplary embodiments of FIG. 1 to FIG. 18.

The processor (1910) and (1960) may include an application-specific integrated circuit (ASIC), another chip set, a logical circuit, a data processing device, and/or a converter converting a baseband signal and a radio signal to and from one another. The memory (1920) and (1970) may include a read-only memory (ROM), a random access memory (RAM), a flash memory, a memory card, a storage medium, and/or another storage device. The RF unit (1930) and (1980) may include one or more antennas transmitting and/or receiving radio signals.

When the exemplary embodiment is implemented as software, the above-described method may be implemented as a module (process, function, and so on) performing the above-described functions. The module may be stored in the memory (1920) and (1970) and may be executed by the processor (1910) and (1960). The memory (1920) and (1970) may be located inside or outside of the processor (1910) and (1960) and may be connected to the processor (1910) and (1960) through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for transmitting an uplink frame in a wireless LAN system, comprising:

after a first trigger frame for uplink transmission of multi-users is received from an access point (AP), configuring, by a user station (STA), a backoff counter for a contention-based channel access based on first parameter information for the multi-users;

performing, by the user STA, a countdown operation based on the backoff counter configured based on the first parameter information;

after a second trigger frame is received, suspending, by the user STA, the countdown operation to transmit a trigger-based uplink frame as a response to the second trigger frame; and if an acknowledgement (ACK) frame for the trigger-based uplink frame is not received, resuming, by the user STA, the suspended countdown operation.

2. The method of claim 1, further comprising:

performing, by the user STA, the countdown operation based on the backoff counter configured based on second parameter information for a single user, until the first trigger frame is received after a reception of a beacon frame being periodically transmitted from the AP.

3. The method of claim 2, further comprising:

after the first trigger frame is received, initiating, by the user STA, a timer operation based on timer information related to a valid interval that the first parameter information is validly to be used.

4. The method of claim 3, wherein the first parameter information, the second parameter information, and the timer information are included in the beacon frame.

5. The method of claim 4, wherein the first parameter information includes a first arbitration interframe space (AIFS) value set for the multi-users, a first contention window (CW) minimum value set, and a first CW maximum value set, and wherein the second parameter information includes a second AIFS value set for operations of a Quality of Service (QoS) facility, a second CW minimum value set, and a second CW maximum value set.

6. The method of claim 5, wherein the first AIFS value set includes a first value used for a first access category of the access category background (AC_BK) type, a second value used for a second access category of the access category best effort (AC_BE) type, a third value used for a third access category of the access category video (AC_VI) type, and a fourth value used for a fourth access category of the access category voice (AC_VO) type, wherein the first CW minimum value set includes a fifth value used for the first access category, a sixth value used for the second access category, a seventh value used for the third access category, and an eighth value used for the fourth access category, and wherein the first CW maximum value set includes a ninth value used for the first access category, a tenth value used for the second access category, an eleventh value used for the third access category, and a twelfth value used for the fourth access category.

7. The method of claim 6, wherein the second AIFS value set includes a thirteenth value used for the first access category, a fourteenth value used for the second access category, a fifteenth value used for the third access category, and a sixteenth value used for the fourth access category, wherein the second CW minimum value set includes a seventeenth value used for the first access category, an eighteenth value used for the second access category, a nineteenth value used for the third access category, and a twentieth value used for the fourth access category, and wherein the second CW maximum value set includes a twenty-first value used for the first access category, a twenty-second value used for the second access category, a twenty-third value used for the third access category, and a twenty-fourth value used for the fourth access category.

8. The method of claim 7, wherein each of the first to fourth values is configured to be greater than each of the thirteenth to sixteenth values configured in the corresponding access category,
wherein each of the fifth to eighth values is configured to be greater than each of the seventeenth to twentieth values configured in the corresponding access category, and
wherein each of the ninth to twelfth values is configured to be greater than each of the twenty-first to twenty-fourth values configured in the corresponding access category.

9. A wireless device using a method for transmitting an uplink frame in a wireless LAN system, the wireless device comprising:
a transceiver transceiving radio signals; and
a processor being operatively connected to the transceiver,
wherein the processor is configured:
to configure a backoff counter for a contention-based channel access based on first parameter information for the multi-users, after a first trigger frame for uplink transmission of multi-users is received from an access point (AP),
to perform a countdown operation based on the backoff counter configured based on the first parameter information;
to suspend the countdown operation for transmitting a trigger-based uplink frame as a response to a second trigger frame, after the second trigger frame is received, and
to resume the suspended countdown operation, if an acknowledgement (ACK) frame used for the trigger-based uplink frame is not received.

* * * * *